United States Patent
Hirabayashi et al.

(10) Patent No.: US 10,768,329 B2
(45) Date of Patent: Sep. 8, 2020

(54) SEISMIC SENSING SYSTEMS AND PROCESSES FOR USING SAME

(71) Applicant: Schlumberger Technology Corporation, Sugar Land, TX (US)

(72) Inventors: Nobuyasu Hirabayashi, Yokohama (JP); John Tulett, Yokohama (JP); Maduranga Liyanage, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 375 days.

(21) Appl. No.: 15/788,984

(22) Filed: Oct. 20, 2017

(65) Prior Publication Data

US 2018/0284309 A1 Oct. 4, 2018

Related U.S. Application Data

(63) Continuation-in-part of application No. 15/476,364, filed on Mar. 31, 2017, now Pat. No. 10,613,242.

(51) Int. Cl.
*G01V 1/50* (2006.01)
*G01V 1/46* (2006.01)
(Continued)

(52) U.S. Cl.
CPC .............. *G01V 1/50* (2013.01); *E21B 43/26* (2013.01); *E21B 47/14* (2013.01); *E21B 47/18* (2013.01);
(Continued)

(58) Field of Classification Search
CPC ........ G01V 1/50; G01V 1/46; G01V 2210/63; E21B 43/26; E21B 47/18; E21B 49/008; E21B 47/14
See application file for complete search history.

(56) References Cited

U.S. PATENT DOCUMENTS 5,548,562 A 8/1996 Helgerud et al.
6,002,339 A 12/1999 Norris
(Continued)

FOREIGN PATENT DOCUMENTS

WO WO2011044352 A2 4/2011

OTHER PUBLICATIONS

Pavlidi et al., "Real-Time Multiple Sound Source Localization and Counting Using a Circular Microphone Array", IEEE Transactions on Audio, Speech, and Language Processing, vol. 21, No. 10, Oct. 2013 (Year: 2013).*

(Continued)

*Primary Examiner* — Regis J Betsch
(74) *Attorney, Agent, or Firm* — Eileen Pape

(57) ABSTRACT

Seismic systems and processes for making and using same. In some examples, the seismic system can include an acoustic tool configured for placement in a wellbore penetrating a subterranean formation. The acoustic tool can include an acoustic transmitter unit for producing acoustic energy waveforms in the subterranean formation such that the interaction of the acoustic energy waveforms with structures in the formation can be an event that generates event signals. A receiver unit can include acoustic receivers distributed azimuthally around a central axis of the acoustic tool for sensing the event signals. The acoustic tool can determine event signal amplitudes of the event signals at each of the acoustic receivers, can determine which of the acoustic receivers has a maximum amplitude of the event signal amplitudes, and can interpolate between the maximum amplitude acoustic receiver and one or more adjacent acoustic receivers to find an azimuthal direction of the event.

8 Claims, 16 Drawing Sheets

(51) Int. Cl.
*E21B 47/18* (2012.01)
*E21B 49/00* (2006.01)
*E21B 47/14* (2006.01)
*E21B 43/26* (2006.01)

(52) U.S. Cl.
CPC .............. *E21B 49/008* (2013.01); *G01V 1/46* (2013.01); *G01V 2210/63* (2013.01)

(56) References Cited

U.S. PATENT DOCUMENTS

| | | | |
|---|---|---|---|
| 6,188,961 B1* | 2/2001 | Mandal | G01V 1/50 702/6 |
| 10,197,691 B2* | 2/2019 | Market | G01V 1/50 |
| 10,294,772 B2* | 5/2019 | Hill | E21B 47/0005 |
| 2005/0034917 A1 | 2/2005 | Mathiszik et al. | |
| 2009/0217074 A1 | 8/2009 | Nichols et al. | |
| 2014/0010045 A1* | 1/2014 | Bennett | G01V 1/50 367/31 |
| 2014/0222344 A1 | 8/2014 | Donderici et al. | |
| 2014/0301164 A1 | 10/2014 | Mandal | |

OTHER PUBLICATIONS

Karbasi et al., "A New DOA Estimation Method Using a Circular Microphone Array", 15th European Signal Processing Conference (EUSIPCO 2007), Poznan, Poland, Sep. 3-7, 2007 (Year: 2007).*
Office Action issued in the related U.S. Appl. No. 15/476,364 dated May 9, 2019 (18 pages).
Warpinski et al., "Microseismic Mapping of Hydraulic Fractures Using Multi-Level Wireline Receivers", SPE 30507—presentation at the SPE Annual Technical Conference & Exhibition held in Dallas, U.S.A., Oct. 22-25, 1995 (11 pages).
Schoenberg, "Elastic wave behavior across linear slip interfaces," J. Acoust. Soc. Am. 68(5), Nov. 1980, pp. 1516-1521.
Schoenberg, Fluid and solid motion in the neighborhood of a fluid-filled borehole due to the passage of a low-frequency elastic plane wave, Geophysics, vol. 51, No. 6 (Jun. 1986), p. 1191-1205.
Peng et al., "Borehole effects on downhole seismic measurements", Geophysical Prospecting 41, 883-912, Oct. 1993.
Tang et al., "Single-well S-wave imaging using multicomponent dipole acoustic-log data", Geophysics, vol. 74, No. 6 (Nov.-Dec. 2009); p. WCA211-WCA223
Esmersoy et al., Fracture and Stress Evaluation Using Dipole-Shear Anisotrophy Logs, SPWLA 36th Annual logging Symposium, Jun. 26-29, 1995 (12 pages).

* cited by examiner

SEISMIC SENSING SYSTEMS AND PROCESSES FOR USING SAME

CROSS-REFERENCES TO RELATED APPLICATION

This application is a continuation-in-part of co-pending U.S. patent application Ser. No. 15/476,364, filed on Mar. 31, 2017, which is incorporated by reference herein.

BACKGROUND

Generally, seismic sensing devices, e.g., a receiver or sensor, can detect seismic signals, e.g., vibration, in the surrounding environment. In some instances, the seismic signals can be indicative of characteristics of the surrounding environment. Thus, seismic sensing devices can be used in various contexts, such as a downhole tool. In a downhole tool, multiple seismic sensing devices can be employed to facilitate conducting micro-seismic surveys, for example, to determine event hypocenter locations and/or moment tensor inversion solutions. Yet coordinating the operation of the multiple seismic sensing devices can be frustrated by variations in operation of these different components.

A Borehole Acoustic Reflection Survey ("BARS") is utilized to image near-wellbore structures in a subterranean formation penetrated by the wellbore. Such imaging utilizes waveform data acquired by an acoustic tool conveyed within the wellbore. Such acoustic tools include acoustic transmitters and receivers operable to acquire the waveform data. That is, acoustic signals transmitted from a transmitter reflect from boundaries and fractures of the formation before being detected by the azimuthally spaced receivers. The detected signals are processed to generate the waveform data indicative of physical and/or other parameters of the formation. The BARS data provides a two-dimensional image, in directions of the longitudinal axis of the wellbore and the distance between the wellbore axis and the near-wellbore features ("reflectors") in the formation. The azimuthal location of each reflector is determined using differences between arrival times of the signals corresponding to the same reflector ("event signals") at the azimuthally spaced receivers, based on the assumption that the wavefield excited by the reflected wave in the wellbore is a plane wave. Thus, the recorded event signals are expressed by time shifts, and the amplitudes and shapes of signals are identical for the azimuthally spaced receivers.

However, in actual BARS data acquired in real wellbores, event signals received by the different receivers exhibit apparent amplitude differences for P-waves and SV-waves. The apparent amplitude differences are inconsistent with the above-described assumption that the wavefield excited by the reflected wave in the wellbore can be regarded as a plane wave. Consequently, the azimuthal locations of reflectors determined utilizing this assumption are inaccurate.

SUMMARY

Seismic sensing systems and processes for making and using same are provided. In some examples, the seismic system can include an acoustic tool configured for placement in a wellbore penetrating a subterranean formation. The acoustic tool can include an acoustic transmitter unit for producing acoustic energy waveforms in the subterranean formation. The acoustic energy waveforms can be produced such that interaction of the acoustic energy waveforms with structures in the formation is an event that generates event signals. A receiver unit of the acoustic tool can have acoustic receivers distributed azimuthally around a central axis of the acoustic tool for sensing the event signals. The acoustic tool can determine event signal amplitudes of the event signals at each of the acoustic receivers and can determine which of the acoustic receivers has a maximum amplitude of the event signal amplitudes. The acoustic tool can interpolate between the maximum amplitude acoustic receiver and one or more adjacent acoustic receivers to find an azimuthal direction of the event.

In some examples, a process can include receiving acoustic waveforms with a downhole receiver unit having a plurality of acoustic receivers that are arranged azimuthally around a center axis of the receiver unit. The receiver unit can produce waveform signals in response to the received acoustic waveforms. Direct waves and modes can be removed from the waveform signals and event signals can be extracted from the waveform signals. The waveform signals can be migrated for each azimuth of the acoustic receivers to produce migration images. A dip of a reflector can be estimated and amplitudes of the event signals can be estimated. The acoustic receiver azimuth that is most closely oriented to the incoming wave direction can be selected and an azimuthal direction of acoustic wave forms can be identified using the selected acoustic receiver and at least one acoustic receiver adjacent to the selected acoustic receiver.

In some examples, a process for monitoring a hydraulic fracture can include generating test pulses at predetermined times in at least one monitoring well. Test pulses can be captured as test pulse event signals in the monitoring well. The test pulse event signals can be sent to surface equipment, and the test pulse event signals can be compared to the predetermined times to verify at least one formation velocity.

DETAILED DESCRIPTION

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness. A seismic sensing device can receive seismic signals to facilitate determining characteristics of its surrounding environment. As such, seismic sensing devices can be used in various contexts. To help illustrate, the present disclosure presents techniques described in a downhole context or downhole environment. It should be appreciated that this is illustrative and not limiting. In other words, the techniques described in the present disclosure can be applied in other suitable contexts or environments.

Azimuthal Determination of Event Direction for Dipole Source

Figure 1:
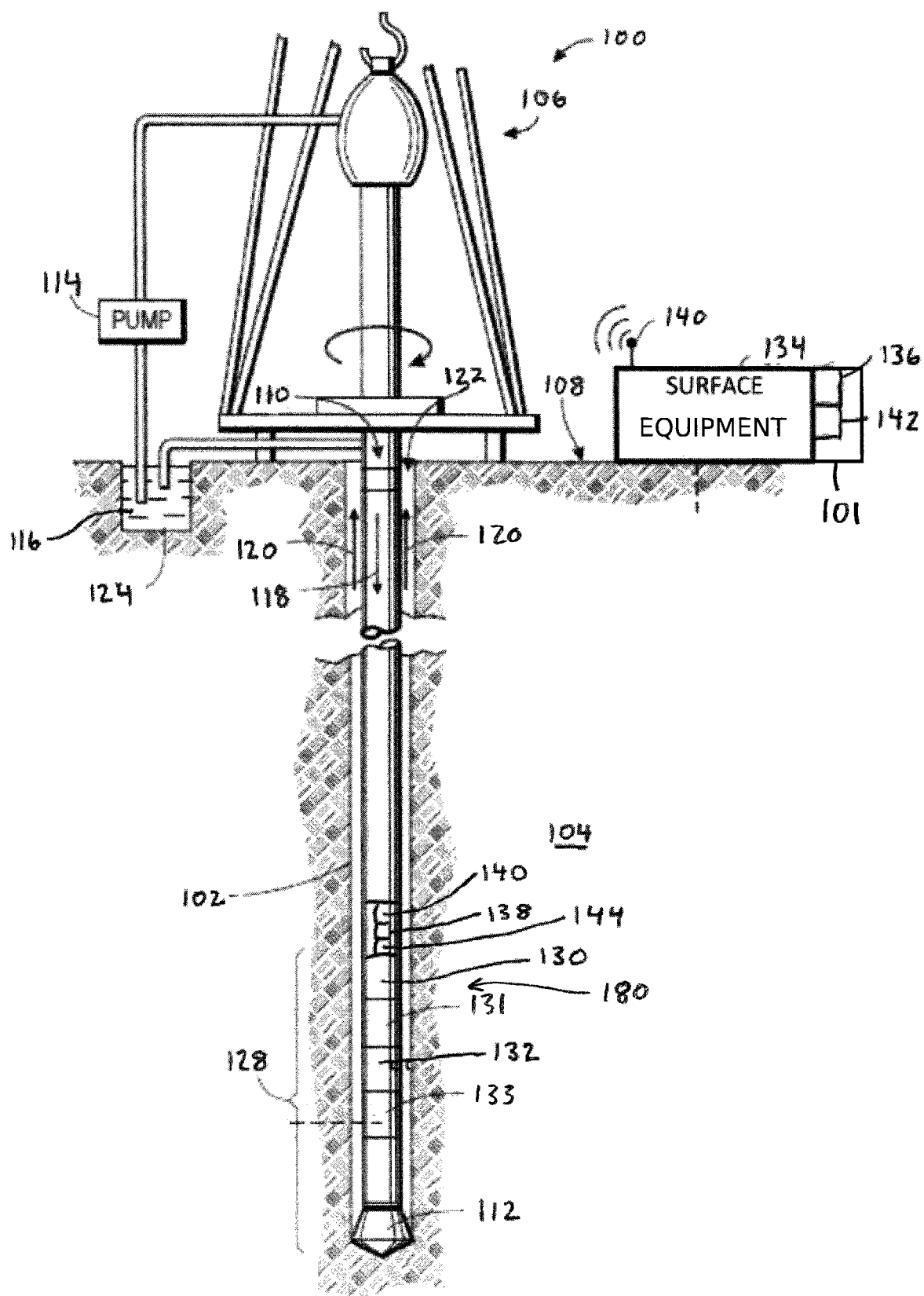
FIG. 1 depicts a schematic diagram of an illustrative wellsite system to which one or more aspects of the present disclosure may be applicable, according to one or more embodiments described.

FIG. 1 depicts a schematic view of an illustrative wellsite system 100 to which one or more aspects of the present disclosure may be applicable, according to one or more embodiments. The wellsite system 100 can be onshore or offshore. In the wellsite system 100 shown in FIG. 1, a wellbore 102 can be formed in one or more subterranean formation 104 by rotary drilling. Other example systems within the scope or the present disclosure can also or instead utilize directional drilling. While some elements of the wellsite system 100 are depicted in FIG. 1 and are described below, it is to be understood that the wellsite system 100 can include other components in addition to, or in place of, those presently illustrated and described.

In the depicted embodiment shown in FIG. 1, the wellsite system 100 includes a drilling rig 106 at the surface 108 that can be arranged to rotate a drill string 110 and a drill bit 112 to drill the subterranean formation 104. A drilling fluid pump 114 can pump a drilling fluid 116 down the drill string 110 in the direction of arrow 118 to the drill bit 112 for cooling and/or lubrication. The drilling fluid can exit the drill string 110 and can flow in the direction of arrows 120 through an annulus 122 between the drill string 110 and the formation 104, and can return to a mud pit 124 for reuse.

The drill string 110 can include a bottom-hole assembly (BHA) 128 that can include the drill bit 112, one or more logging-while-drilling (LWD) modules (two are shown 130, 131) and/or one or more measurement-while-drilling (MWD) modules (two are shown 132, 133), as well as other modules and/or tools. The LWD module 130 and/or 131 can include an acoustic tool including one or more acoustic transmitters and one or more acoustic receivers. The bottom-hole assembly can be arranged differently than is shown, for example, the LWD module(s) 130/131 and the MWD modules 132 can be positioned differently.

The wellsite system 100 can include a data processing system 101. The data processing system 101 can include a processor 136 associated with the surface equipment 134, control devices and/or electronics in the surface equipment 134, in one or more of the modules of the BHA 128 (such as a downhole processor 138), a remote computer system (not shown), communication equipment, and/or in other equipment. The data processing system 101 can include one or more computer systems or devices and/or can be a distributed computer system. For example, collected data or information can be stored, distributed, communicated to an operator, and/or processed locally and/or remotely.

The data processing system 101 can, individually or in combination with other system components, perform the methods and/or processes described below, or at least portions thereof. For example, such data processing system 101 can include processor capability for collecting data relating to acoustic signals transmitted and received by an acoustic tool of the LWD module 130 and/or 131. Processes within the scope of the present disclosure can be implemented by one or more computer programs that run in one or more processors located, for example, in one or more modules of the BHA 128 and/or the surface equipment 134. Such program(s) can utilize data received from the BHA 128 via wireless transceiver, mud-pulse telemetry, and/or other telemetry means 140, and/or can transmit control signals to operative elements of the BHA 128. The programs can be stored on a tangible, non-transitory, computer-usable storage medium associated with the one or more processors 138 of the BHA 128 and/or surface equipment 134, or can be stored on an external, tangible, non-transitory, computer-usable storage medium that can be electronically coupled to such processor(s), such as memory 142 associated with processor 136 and/or memory 144 associated with processor 138. The storage medium can be one or more known or future-developed storage media, such as a magnetic disk, an optically readable disk, flash memory, or a readable device of another kind, including a remote storage device coupled over a communication link, among other examples.

Figure 2:
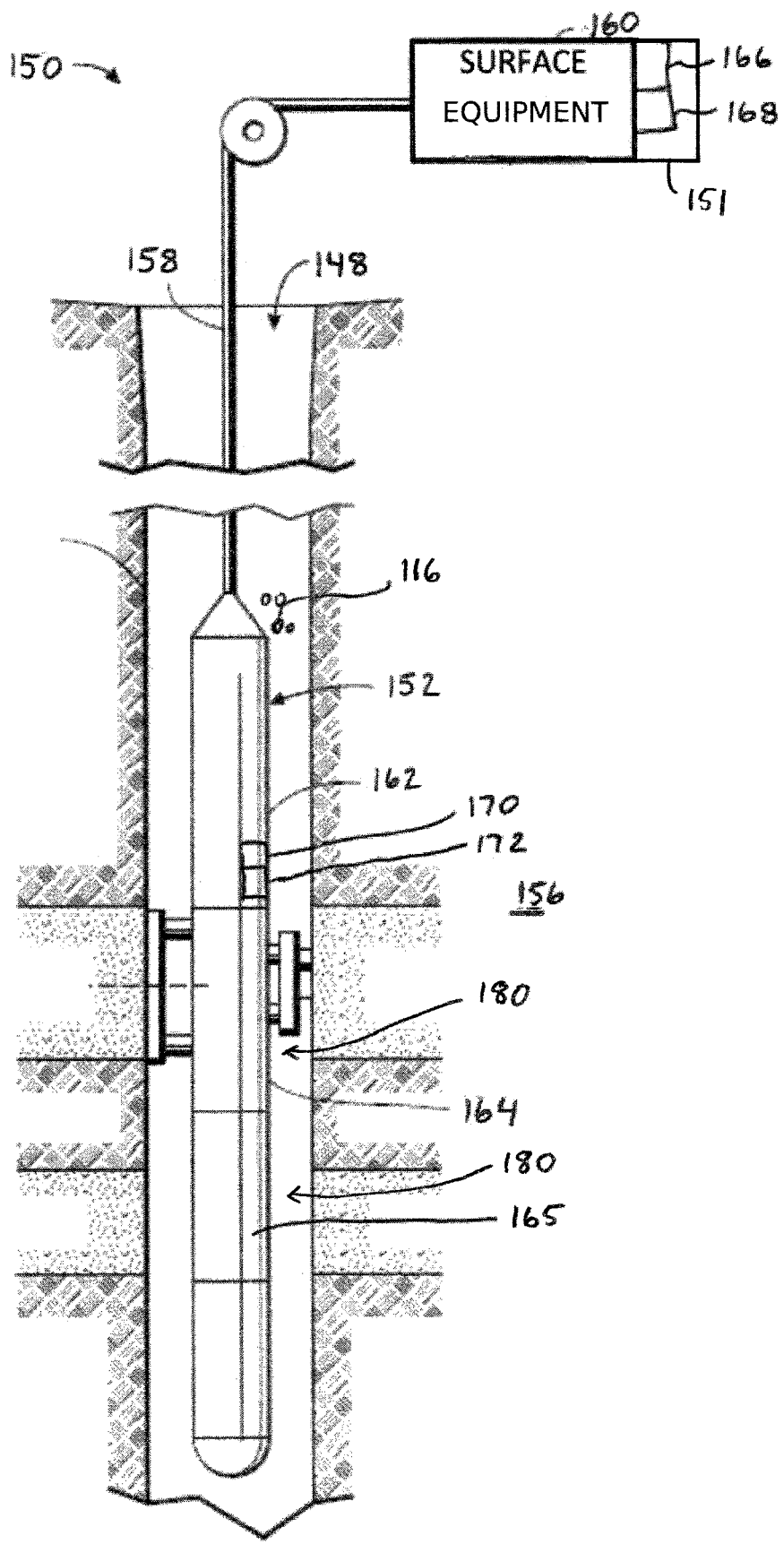
FIG. 2 depicts a schematic diagram of another illustrative of a wellsite system to which one or more aspects of the present disclosure may be applicable, according to one or more embodiments described.

FIG. 2 depicts a schematic view of another illustrative of a wellsite system 150 to which one or more aspects of the present disclosure may be applicable, according to one or more embodiments. The wellsite system 150 can be onshore or offshore. In the example wellsite system 150 shown in FIG. 2, a tool string 152 can be conveyed into a wellbore 102 in a subterranean formation 156 via a wireline 158 and/or other conveyance apparatus. An annulus area 148 can be defined between the tool string 152 and the wellbore 102 and can contain a fluid 116 such as water, a drilling fluid, or other fluid(s). The wireline 158 can be a multi-conductor logging cable and can include at least one conductor that can facilitate data communication between the tool string 152 and surface equipment 160.

The tool string 152 can include one or more elongated housings 162 that can encase one or more electronic components and/or modules schematically represented in FIG. 2. For example, the tool string 152 can include acoustic logging modules (two are shown 164, 165), that can include acoustic tools having one or more acoustic transmitters and one or more acoustic receivers, as described below. The wellsite system 150 can also include a data processing system 151. The data processing system 151 can include a processor 166 and memory 168 as well as control devices and/or other electronics associated with the surface equipment 160. The data processing system 151 can also include a processor 170 and memory 172, and control devices and/or other electronics associated with the tool string 152. The processor 170 and memory 172 can be part of one or more of the acoustic logging modules 164/165 or can be part of another portion of the tool string 152. The data processing system 151 can include one or more computer systems or devices and/or can be a distributed computer system. For example, collected data or information can be stored, distributed, communicated to an operator, and/or processed locally and/or remotely.

Referring to FIGS. 1 and 2, in some examples, the processors 136, 138, 166, and 170 can include one or more general purpose microprocessors, one or more application specific processors (ASICs), one or more field programmable logic arrays (FPGAs), or any combination thereof. In some examples, the memory 142, 144, 168 and 172 can be a tangible, non-transitory, computer-readable medium that stores instructions executable by and data to be processed by the associated processor. Thus, in some embodiments, the memory 142, 144, 168 and 172 can include random access memory (RAM), read only memory (ROM), rewritable flash memory, hard drives, optical discs, and the like.

Figure 3:
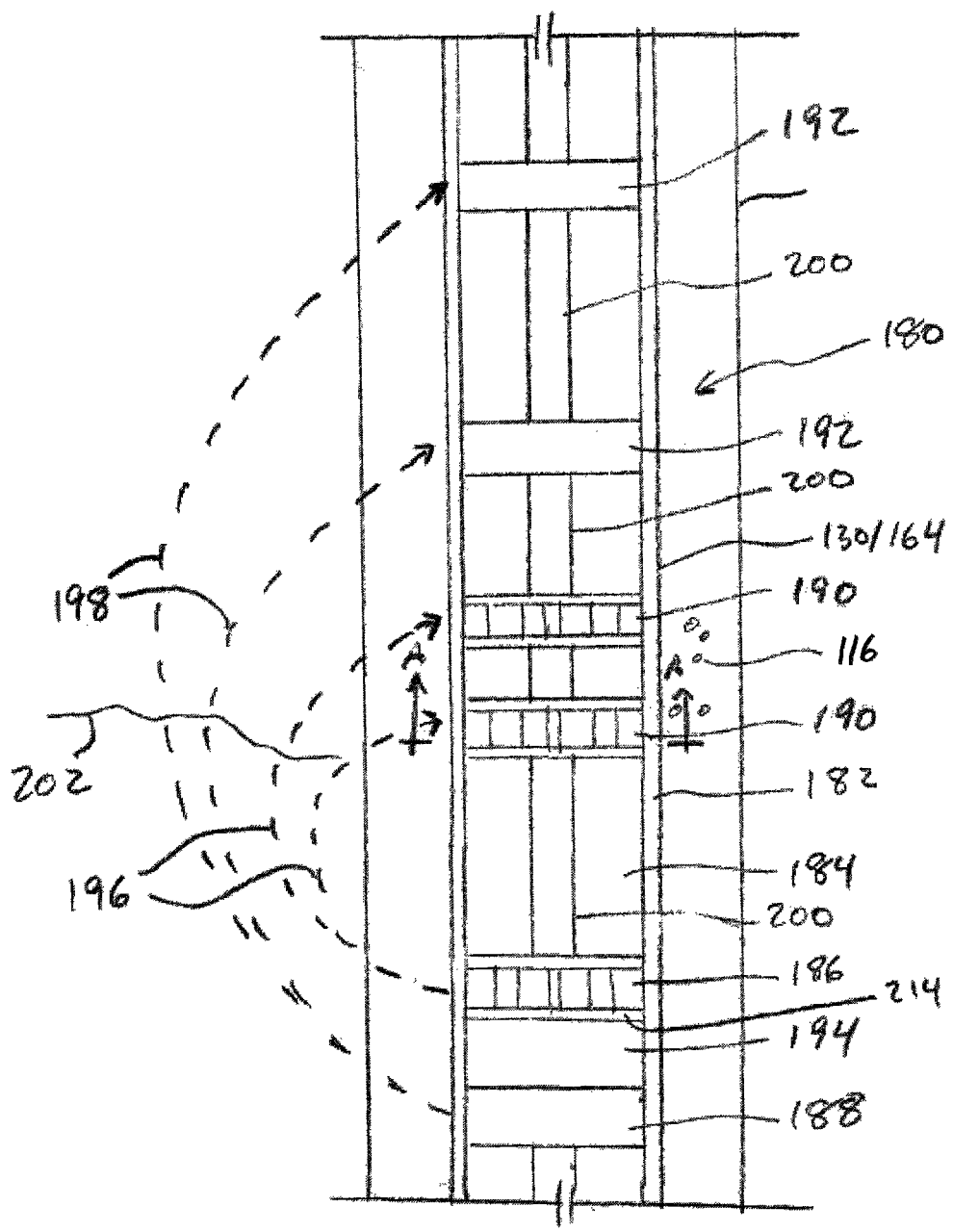
FIG. 3 depicts a schematic cut-away view of a portion of an example implementation of an acoustic tool shown in FIGS. 1 and 2, according to one or more embodiments described.

FIG. 3 depicts a schematic cut-away view of at least a portion of an example implementation of an acoustic tool 180 shown in FIGS. 1 and 2, according to one or more embodiments. The acoustic tool 180 can be implemented as one or more of the LWD modules 130/131 shown in FIG. 1 and/or one or more of the acoustic logging modules 164/165 shown in FIG. 2. The acoustic tool 180 can be positioned for operation in the wellbore 102 and can be surrounded by a fluid, such as drilling fluid 116 or other fluid.

In one or more examples, the acoustic tool 180 can include one or more acoustic transmitter units (two are shown 186 and 188) that can produce acoustic energy and one or more receiver units (two are shown 190 and 192) that can sense acoustic energy and produce electrical signals that can be representative of the sensed acoustic energy. The acoustic tool 180 can include a housing 182 that can surround and seal an inner chamber 184. In some examples, one or more of the acoustic transmitter units 186 and 188 and/or the receiver units 190 and 192 can be disposed within the inner chamber 184. The inner chamber 184 can be filled with oil or another liquid and the liquid can have material properties similar to the material properties of the fluid 116 in the wellbore 102. The acoustic tool 180 can include electronics 194, which can include, for example, the processor 138/170 and memory 144/172 shown in FIGS. 1 and 2. The transmitter units 186, 188, the receiver units 190, 192, and the electronics can be structurally supported by a structural member 200.

In one or more examples, the electronics 194 can be operable to cause the transmitter unit 186 to emit an acoustic waveform 196 and/or to cause the transmitter unit 188 to emit an acoustic waveform 198. The transmitter unit 186 can be operable to excite acoustic energy to induce monopole, dipole, and other higher order azimuthal waveform modes. In one or more examples, the electronics 194 can be operable to cause the receiver unit 190 to sense the acoustic waveform 196 and/or the receiver unit 192 to sense the acoustic waveform 198. In one or more examples, the acoustic waveforms 196 and/or 198 can pass through the housing 182, and the fluid 116 to near borehole structures 202 in the subterranean formation 104/156 before returning through the fluid 116 and housing 182 to the receiver unit 190 and/or 192. The acoustic waveform interaction with the near borehole structure 202 can be referred to as an "event."

Figure 4:
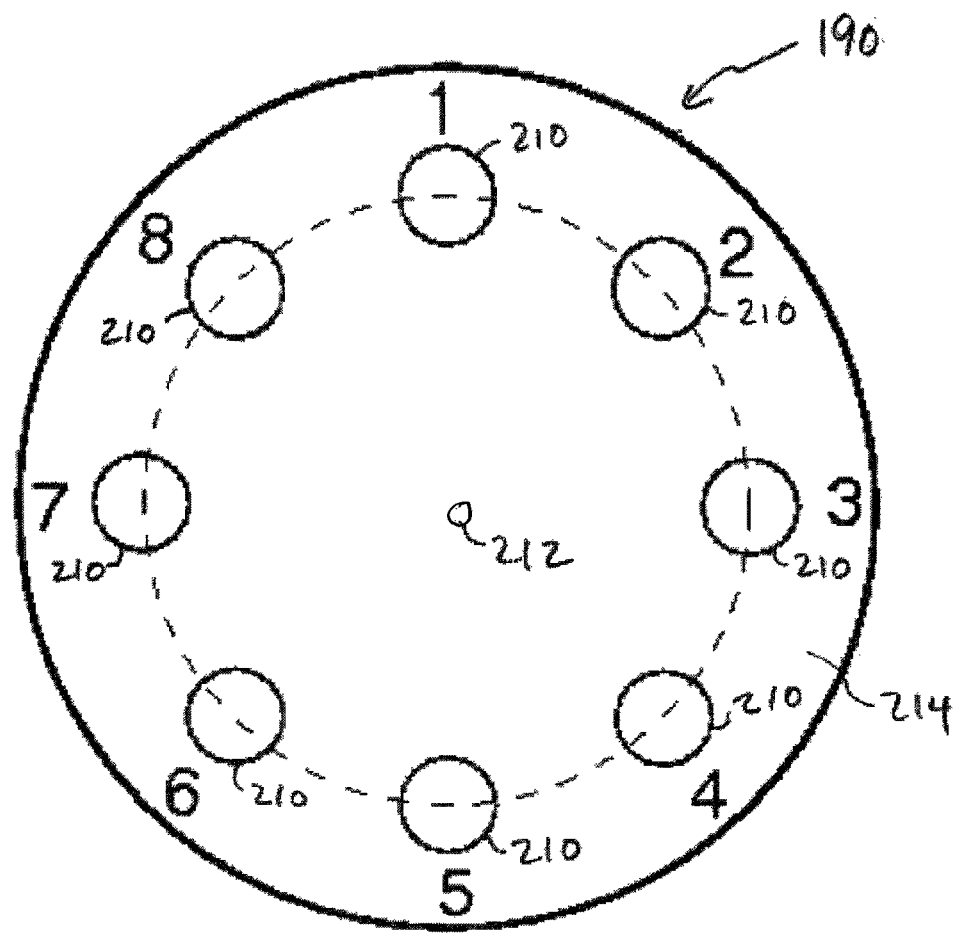
FIG. 4 depicts a cross-sectional view of the acoustic tool shown in FIG. 3 along line A-A.

FIG. 4 depicts a cross-sectional view of the acoustic tool 180 shown in FIG. 3 along line A-A. In one or more examples, the receiver unit 190 can include eight acoustic receivers 210. In some examples, the acoustic receivers 210 can be distributed azimuthally around a central axis 212 and which are indexed numerically 1-8. In one or more examples there can be an even number of acoustic receivers 210. For example, the acoustic tool 180 can include eight, ten, twelve, or more acoustic receivers 210 that can be distributed evenly and azimuthally around the central axis 212 of the receiver unit 190. The receiver units 210 can be positionally fixed to a structural member 214 (FIG. 3).

In one or more examples, the direction of the event can be observed in the waveform when sensed by the receiver unit 190. The acoustic waveform 196 produced by the transmitter unit 186 can be a dipole mode waveform which can be sensed by the receiver unit 190 after the event of the waveform 196 interacts with the near borehole structure 202. For a receiver unit 190 having N azimuthal receivers 210, the waveforms can be composed as set forth in Equation (1).

$$W_i(t) = \sum_{j=1}^{\frac{N}{2}-1} (w_{i+j}(t) - w_{i+N-j}(t)) \qquad (1)$$

where:
N is an even number, which can be equal or greater than 8;
i is azimuthal index of the receivers;
$W_i(t)$ is the composed waveform oriented for the i th receiver direction; and
$w_j(t)$ is the waveform of the j th receiver.
Here, for j>N, $w_j(t)$ is defined as set forth in Equation (2).

$$w_j(t) = w_{j-N}(t) \qquad (2)$$

Note that there can be a relation, shown in Equation (3), and there can be a 180 degree ambiguity.

$$w_j(t) = -w_{j+\frac{N}{2}}(t) \qquad (3)$$

In some examples, $W_{i+1/2}(t)$, which is oriented between the i th and i+1 th receivers, is defined as set forth in Equation (4).

$$W_{i+1/2}(t) = \sum_{j=0}^{\frac{N}{2}-1} (w_{i+j}(t) - w_{i+N-1-j}(t)) \qquad (4)$$

Figure 5:
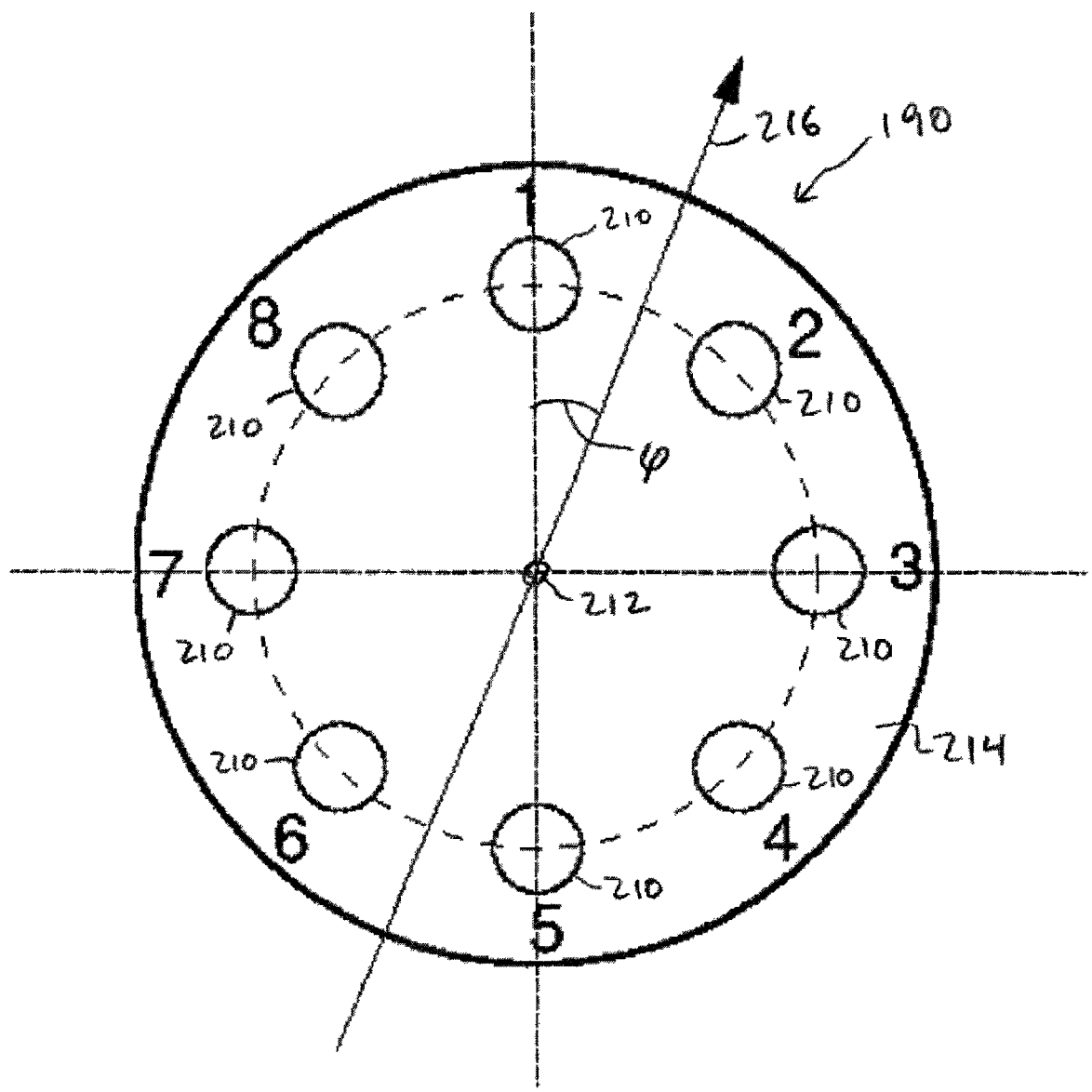
FIG. 5 depicts another cross-sectional view of the acoustic tool shown in FIG. 3 along line A-A.
Figure 11:
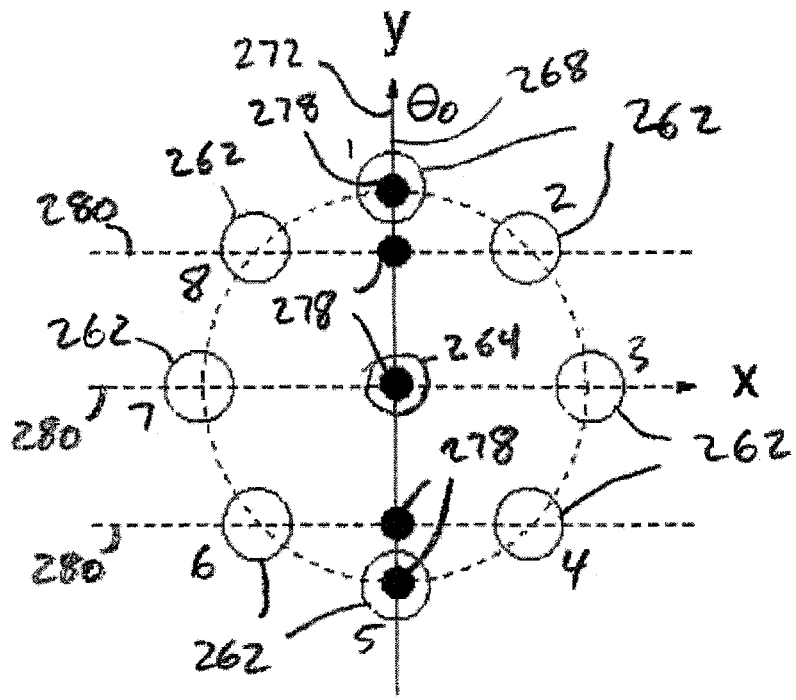
FIGS. 11 and 12 depict sectional schematic views of the example receiver unit shown in FIGS. 9 and 10, respectively, according to one or more embodiments described.

The amplitude of $W_i(t)$ is weighted by sin φ, where φ is the angular difference from the event direction. FIG. 5 depicts another cross-sectional view of the acoustic tool shown in FIG. 3 along line A-A. The oriented direction for 1+1/2 is shown in FIG. 11 by arrow 216. By taking the azimuthal index, while providing the maximum amplitude over the composed waveforms, as j, the following set of equations (5)-(7) are solved for a, b and c, $$u_{j-1} = a\left(-\frac{2\pi}{N} - c\right)^2 + b \quad (5)$$

$$u_j = a(-c)^2 + b \quad (6)$$

$$u_{j+1} = a\left(\frac{2\pi}{N} - c\right)^2 + b \quad (7)$$

where:
$u_k$ is the maximum amplitude of $W_k$.

Figure 6:
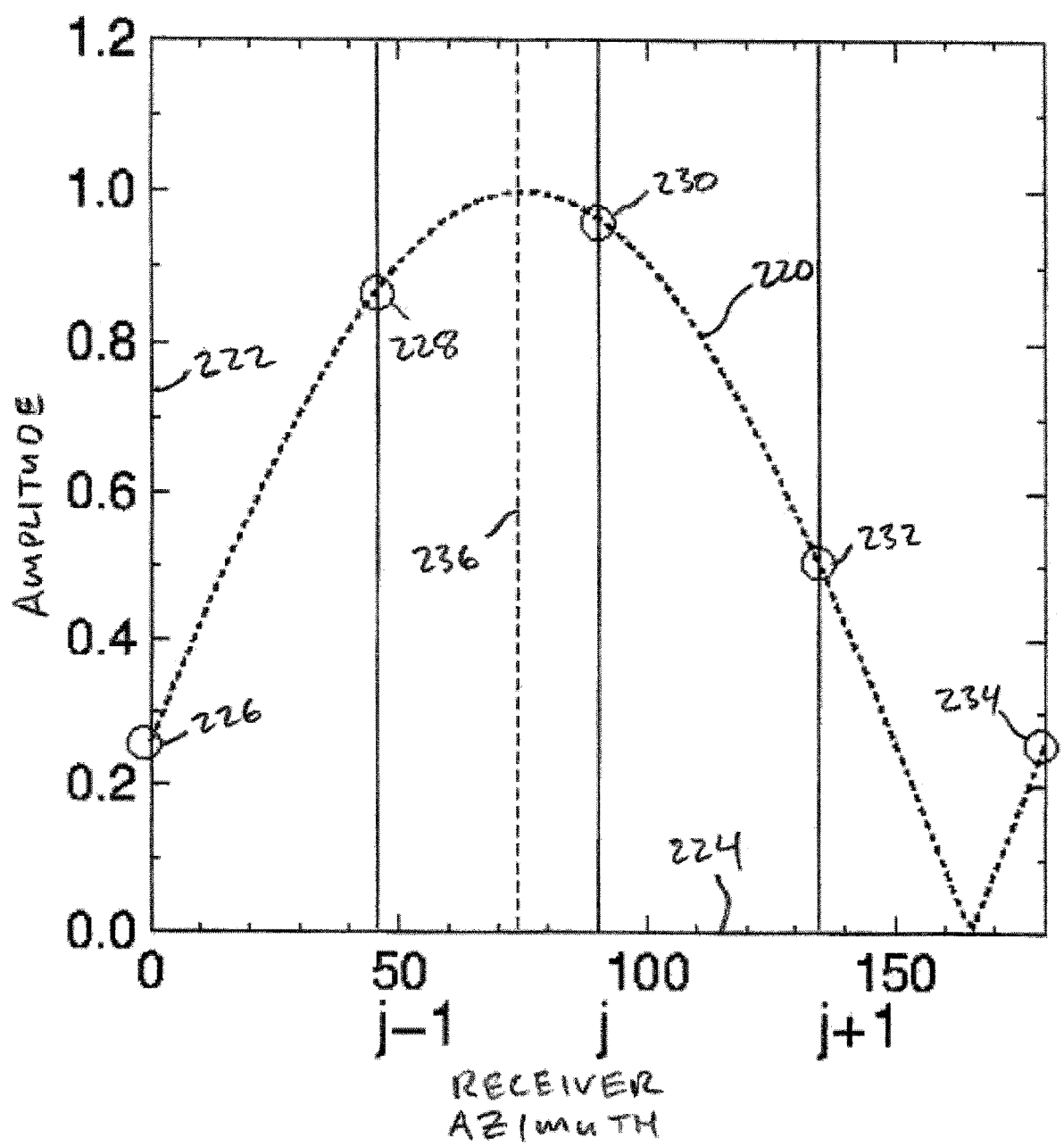
FIG. 6 depicts an illustrative amplitude response of the acoustic tool shown in FIG. 3 with an amplitude axis and an azimuthal angle axis, according to one or more embodiments described.

Suppose the azimuth of j th direction is $\theta_j$, the event direction is given by $\theta_j+c$. FIG. 6 depicts an illustrative amplitude response 220 of the acoustic tool shown in FIG. 3 with an amplitude axis 222 and an azimuthal angle axis 224, according to one or more embodiments. The amplitude response 220 can be determined by interpolating the maximum amplitudes of the waveforms received by the receivers 210 of the receiver unit 190. An amplitude 226 can be the maximum amplitude of the waveform received by the receivers 210 having the index number 1; an amplitude 228 can be the maximum amplitude of the waveform received by the receiver 210 having the index number 2; an amplitude 230 can be the maximum amplitude of the waveform received by the receiver 210 having the index number 3; an amplitude 232 can be the maximum amplitude of the waveform received by the receiver 210 having the index number 4; and an amplitude 234 can be the maximum amplitude of the waveform received by the receiver 210 having the index number 5. The maximum amplitude of the response 220 can be shown by dashed line 236 and corresponds to an azimuthal angle of between 70 and 80 degrees if the receiver 210 having the index number 1 can be at zero degrees and the receiver having the index number 5 can be at 180 degrees.

Figure 7:
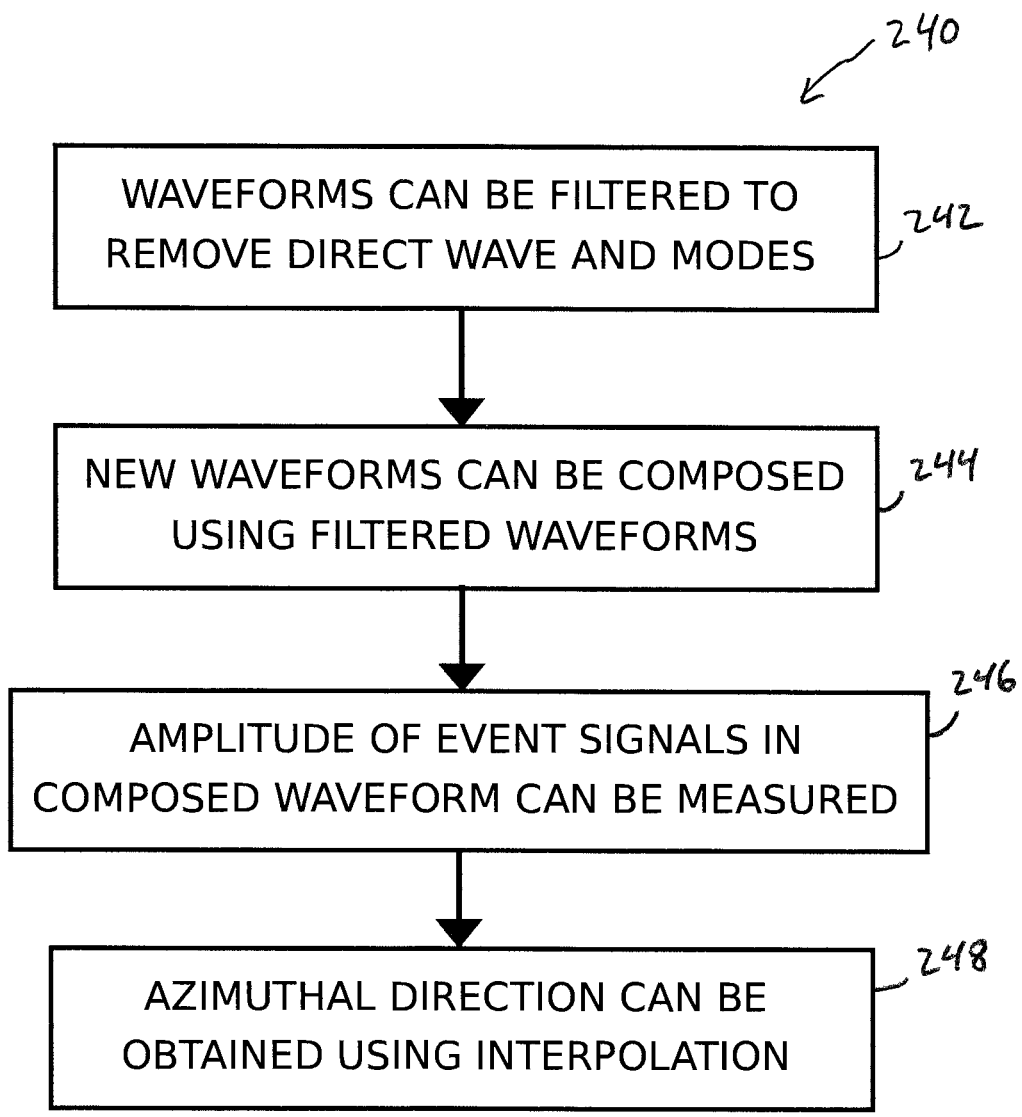
FIG. 7 depicts a flow diagram of a process for determining a direction of an event, according to one or more embodiments described.

FIG. 7 depicts a flow diagram of a process 240 for determining a direction of an event, according to one or more embodiments. Waveforms received by the receiver unit 190 can be filtered to remove the direct wave and modes (process block 242). New waveforms can be composed using the filtered waveforms (process block 244). The amplitude (maximum or RMS) of event signals in the composed waveforms can be measured (process block 246). The azimuthal direction can be obtained using an interpolation (process block 248).

1. A seismic system, comprising: an acoustic tool configured for placement in a wellbore penetrating a subterranean formation, the acoustic tool comprising: an acoustic transmitter unit for producing acoustic energy waveforms in the subterranean formation such that interaction of the acoustic energy waveforms with structures in the formation is an event that generates event signals; and a receiver unit comprising acoustic receivers distributed azimuthally around a central axis of the acoustic tool for sensing the event signals; and wherein the acoustic tool is configured to: determine event signal amplitudes of the event signals at each of the acoustic receivers; and determine which of the acoustic receivers has a maximum amplitude of the event signal amplitudes; and interpolate between the maximum amplitude acoustic receiver and one or more adjacent acoustic receivers to find an azimuthal direction of the event.

2. The seismic system according to paragraph 1, wherein the receiver unit comprises an even number of the acoustic receivers.

3. The seismic system according to paragraph 1 or 2, wherein the receiver unit comprises at least eight of the acoustic receivers.

4. The seismic system according to any one of paragraphs 1 to 3, wherein the acoustic transmitter unit is a dipole acoustic transmitter unit.

5. The seismic system according to any one of paragraphs 1 to 4, wherein the acoustic tool is configured to determine which acoustic receiver has a root-mean-squared maximum amplitude value of the event signal.

6. The seismic system according to any one of paragraphs 1 to 5, wherein the acoustic transmitter unit is configured to produce the acoustic energy waveforms in the subterranean formation when the acoustic tool is surrounded by a fluid in the wellbore.

7. The seismic system according to any one of paragraphs 1 to 6, wherein the acoustic transmitter unit is configured to produce monopole and dipole azimuthal acoustic energy waveform modes.

8. The seismic system according to any one of paragraphs 1 to 7, the acoustic tool further configured to remove direct wave and modes from the acoustic energy waveform before determining the event signal amplitudes.

Identification Processes of Incoming Direction of Incident Waves Using Azimuthally Spaced Hydrophones of a Sonic Logging Tool A Borehole Acoustic Reflection Survey (BARS) is a procedure to image near-borehole structures using a sonic tool in a single well. In some instances, the BARS can also be used for a multi-well survey in which case the sonic tool can record event signals resulting from acoustic transmitters excited in other wellbores. In one or more examples, incoming wave directions can be identified by a sonic logging tool in a borehole. The incoming wave direction can be approximately the same as the direction (or strike) of a reflector when a reflection survey observes the wave signals.

The responses of azimuthally spaced hydrophones are different for incident P-, SV- and SH-waves. The incident P- and SV-waves can be observed for the BARS acquisition from one or more monopole sources and a maximum signal amplitude can be observed by the receiver at the azimuth oriented to the incoming wave direction. The incident SV- and SH-waves are mainly observed for the BARS survey using a dipole source. For the SV-waves, the maximum signal amplitude can be observed by the receiver at the azimuth orthogonally oriented to the incoming waves. The SH-waves can be defined as waves whose particle motions are perpendicular to the well, and the SV-waves can be defined as waves whose particle motion is perpendicular to that of the SH-waves.

A dipole receiver can be constructed by taking differences of waveforms observed by two hydrophones which can be located at symmetric positions with respect to the center of the receiver. Since sensitivity of the dipole receiver can be high to incident SH-waves and low to incident SV-waves, the SH-components can be processed for the incident S-waves when the dipole receivers are used. The weak SV- and P-responses by the dipole receivers have been derived by others and by these properties, the identification processes for the S-waves using dipole receivers can be simplified. Alford rotation can be conventionally used to estimate the strike direction, however, the SV-waves cannot be rotated because the radiation and reception are not reciprocal and therefore the simplified identification processes can be invalid.

Figure 8:
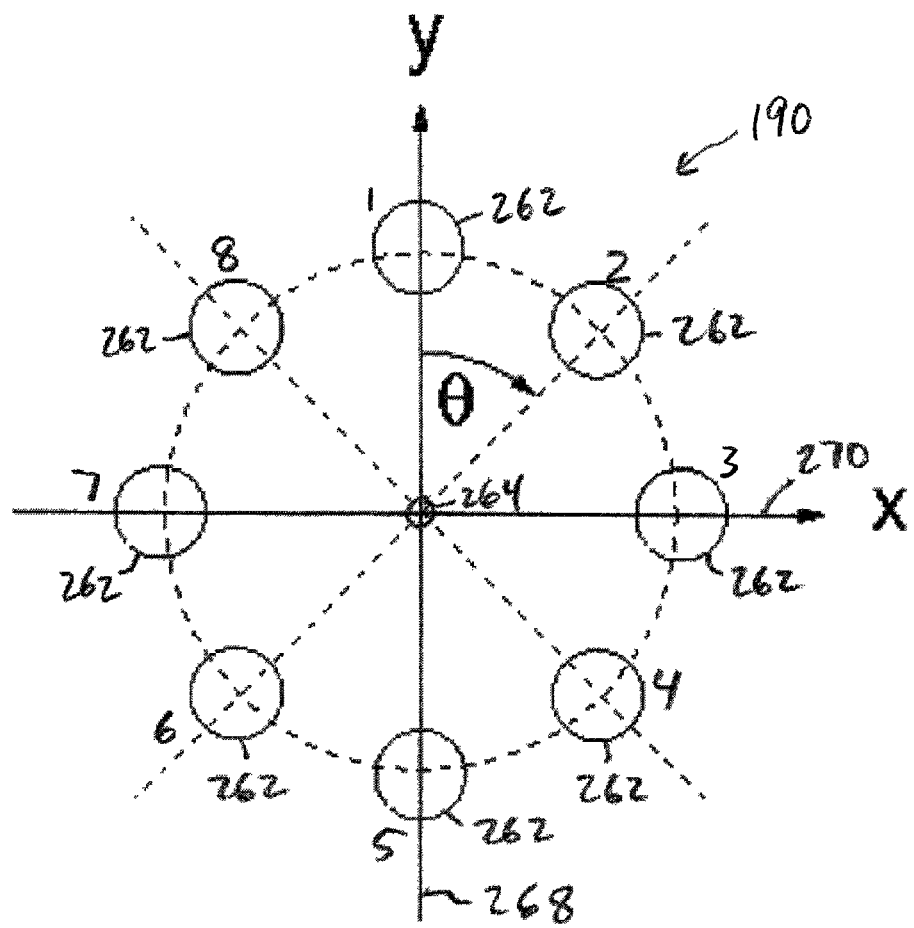
FIG. 8 depicts a sectional schematic view of a portion of an example of a receiver unit shown in FIG. 3, according to one or more embodiments described.

FIG. 8 depicts a sectional schematic view of at least a portion of an example of a receiver unit 190 shown in FIG. 3, according to one or more embodiments. In one or more examples, the receiver unit 190 can include eight receivers 262 which can be spaced azimuthally around a central axis 264. The receiver unit can include more or less receivers 262, and the receivers 262 can be hydrophones. Receiver unit 190 can be part of one or more sonic logging tools such as the LWD module 130 and/or 131 (FIG. 1) and/or one or more of the acoustic logging modules 164 and/or 165 (FIG. 2), or can be part of another type of sonic logging tool. As shown in FIG. 8, the receivers 262 are denoted with index numbers 1-8 for purposes of explanation. The receivers 262 shown in FIG. 8 are spaced apart from one another at 45 degree intervals. An azimuth angle θ, shown by arrow 266, can be measured clockwise from a y-axis 268 and an x-axis 270 can be shown perpendicular to the y-axis. In one or more examples, sonic logging tool 130, 131, 164, and/or 165 having one or more receiver units 190 can be used for identifying directions of incoming waves in a borehole.

In one or more examples, amplitudes of signals produced by one or more receivers 262 can include a maximum amplitude of a signal, a RMS amplitude of a signal, a maximum amplitude of an event signal in a migration image, and/or a RMS amplitude of an event signal in a migration image. The maximum amplitude of a signal can be given by equation (8).

$$\overline{W_k} = \max_{0<t<T} |W_k(t_0 + t)| \tag{8}$$

where:
$W_k(t)$ is the waveform of the k-th azimuth of hydrophone;
$t_0$ is the arrival-time of event signal; and
T is the length of event signal. $t_0$ can be earlier than the arrival-time of event signal. In this case, T is taken longer than the length of event signal. An average or median of $W_k$ can be taken for multi-level hydrophones of the array.

The RMS amplitude of the signal can be given by equation (9).

$$\overline{W_k} = \sqrt{\frac{1}{T}\int_0^T W_k^2(t_0 + t)dt} \tag{9}$$

The maximum amplitude of event signal in migration image can be defined as similar to the waveforms as given in equation (10).

$$A_I = \max_{0<r<z_0, 0<z<Z} |I(r_0 + r, z_0 + z)| \tag{10}$$

where:
I(r, z) can be the 2-D image in the directions of the distance from the center of the well and the depth positions;
$r_0$ is the reference point of the distance from the well;
$z_0$ is the reference point of the depth point;
R and Z are intervals; and
$r_0$, $z_0$, R and Z are selected so that event signal in the image can be included for estimation.

The RMS amplitude of event signal in migration can be defined as similar to the waveforms as given in equation (11).

$$RMS_I = \sqrt{\frac{1}{RZ}\int_0^R \int_0^Z I^2(r_0 + r, z_0 + z)dzdr} \tag{11}$$

The processes presented here work for both the waveforms and migration images for individual azimuths. For the ease of explanation, the processes can be mainly explained using the waveforms.

In one or more examples, the direction of incoming P- and/or SV-waves can be identified for a monopole transmitter source. Using azimuthally spaced receivers 262 (e.g., hydrophones) FIG. 8, the apparent amplitude differences associated with the incoming wave direction can be observed. The receiver 262 oriented to the incoming wave direction shows the largest signal amplitude, and the accurate azimuth between the receiver 262 azimuths can be determined by fitting the signal amplitudes to a quadratic function as shown in equations (12)-(14).

$$u_{-1} = a(-\Delta\theta - c)^2 + b \tag{12}$$

$$u_0 = a(-c)^2 + b \tag{13}$$

$$u_1 = a(\Delta\theta - c)^2 + b \tag{14}$$

where:
Δθ is the azimuthal interval of receivers;
$u_0$ is the amplitude of the receiver giving the maximum amplitude at $\theta_0$;
$u_{-1}$ is the signal amplitude of adjacent receiver at $\theta_0 - \Delta\theta$;
$u_1$ is the signal amplitude of adjacent receiver at $\theta_0 + \Delta\theta$; and
a, b and c are parameters given by solving the equations (12)-(14).

By solving the equations, the accurate azimuth can be given by equation (15).

$$\theta = \theta_0 + c \tag{15}$$

Amplitudes of migration images for each azimuth can also be used for determining the incoming wave direction of the P- and/or SV-waves.

In one or more examples, the direction of an incoming S-wave can be identified using azimuthally spaced receivers 262 (e.g., hydrophones). Waveforms for receivers 262 can be denoted by W(θ, t), where θ is the receiver azimuth 266 (FIG. 8) and t is the recording time. The stacked waveforms for an azimuthal direction can be given by equation (16) when the receiver azimuth 266 is as shown in equation (17); and is given by equation (18) when the receiver azimuth 266 is as shown in equation (19).

$$\overline{W}(\theta_{i-1/2}, t) = \sum_{j=1}^{N/2} [W((i+j-1)\Delta\theta, t) - W((i-j)\Delta\theta, t)] \tag{16}$$

$$\theta_{i-1/2} = i\Delta\theta - \frac{\Delta\theta}{2} \tag{17}$$

$$\overline{W}(\theta_i, t) = \sum_{j=1}^{N/2-1} [W((i+j)\Delta\theta, t) - W((i-j)\Delta\theta, t)] \tag{18}$$

$$\theta_i = i\Delta\theta \tag{19}$$

where:
$\overline{W}(\theta_{i-1/2}, t)$ and $\overline{W}(\theta_i, t)$ are the stacked waveforms;
$\theta_{i-1/2}$ and $\theta_i$ are the azimuthal directions;
N is the number of receivers 262;
Δθ is the azimuthal interval; and
i is the index of the receiver azimuth.

Figure 9:
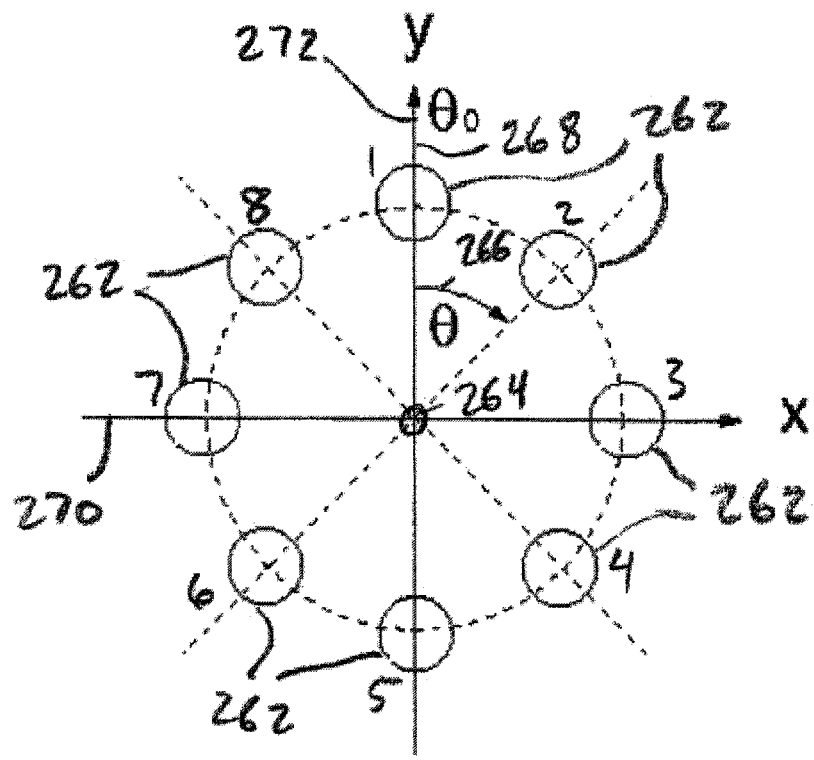
FIGS. 9 and 10 depict sectional schematic views of the example receiver unit shown in FIG. 8, according to one or more embodiments described.
Figure 10:
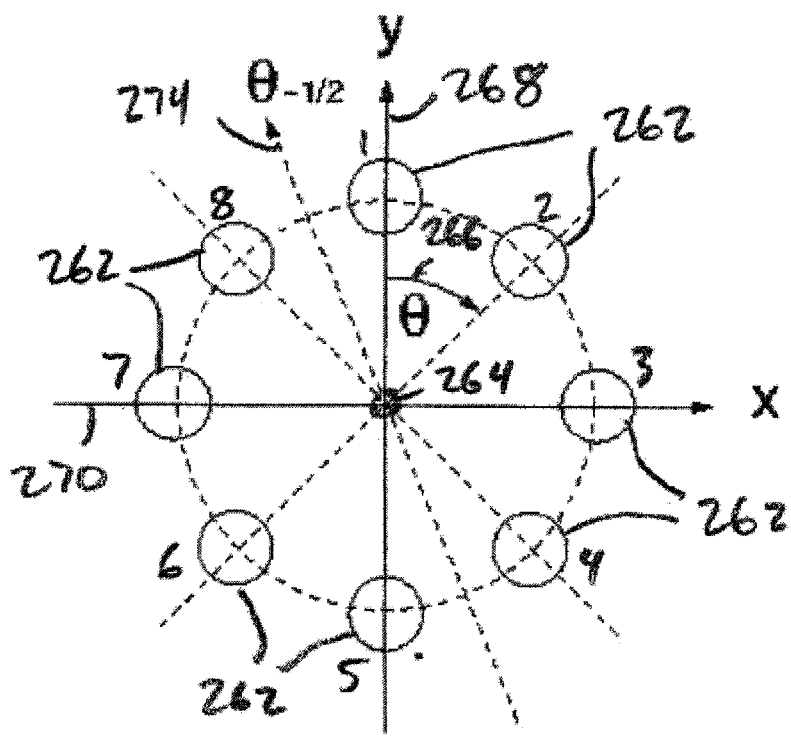

FIGS. 9 and 10 depict sectional schematic views of the example receiver unit 190 shown in FIG. 8, according to one or more embodiments. FIG. 9 shows a direction 272 of $\theta_O$ that is the same as the y-axis 268. FIG. 10 shows a direction 274 of $\theta_{-1/2}$ in which the azimuth is rotated by $-\Delta\theta/2$. In one or more example, the incoming wave direction can be identified by finding the maximum amplitudes of $\overline{W}(\theta_{i-1/2}, t)$ and $\overline{W}(\theta_i, t)$. The receiver 262 at the maximum amplitude azimuth can be found by comparing the migration images for $\overline{W}(\theta_{i-1/2}, t)$ and $\overline{W}(\theta_i, t)$. The optimum migration image can be obtained by processing the stacked waveforms for the azimuth of the identified receiver 262. After identifying the incoming wave direction, summed waveforms on the selected receiver azimuth can be computed using equation (20) for j=1, . . . , N/2; and equation (21) for j=0, . . . , N/2.

$$\overline{W}_j(\theta_{i-1/2}, t) = W((i+j-1)\Delta\theta, t) + W((i-j)\Delta\theta, t) \quad (20)$$

$$\overline{W}_j(\theta_i, t) = W((i+j)\Delta\theta, t) + W((i-j)\Delta\theta, t) \quad (21)$$

Figure 12:
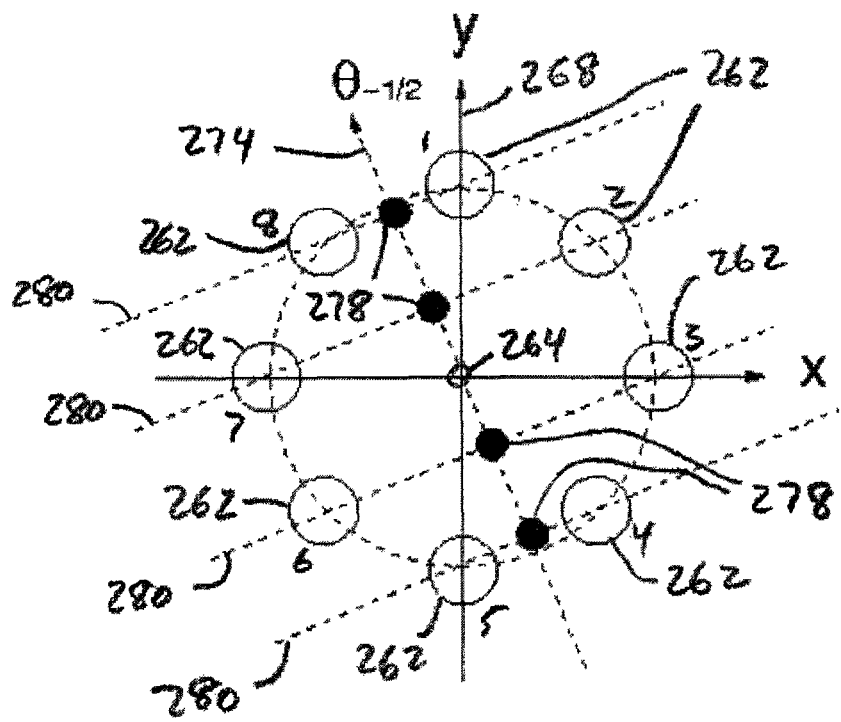

FIGS. 11 and 12 depict sectional schematic views of the example receiver unit 190 shown in FIGS. 9 and 10, respectively, according to one or more embodiments described. In one or more embodiments, the black circles 278 show the positions of the summed waveforms and the dashed lines 280 represent the S-waves. By examining the amplitudes on the central axis 264, the larger amplitude direction can be taken for as the dip direction and a 180 degree ambiguity can be removed. A simplified version can be created by replacing $\overline{W}(\theta_i, t)$ by equation (22) to estimate incoming wave direction.

$$\overline{W}(\theta_i, t) = W((i+j)\Delta\theta, t) - W((-j)\Delta\theta, t) \quad (22)$$

In the procedures shown above, $W(\theta, t)$ and $\overline{W}(\theta, t)$ can be replaced the migration image for individual azimuths.

When x- and y-dipole sources are used, $W(\theta, t)$ can be replaced by equations (23) and (24) and $W^+(\theta, t)$ or $W^-(\theta, t)$ can be selected by finding the larger amplitude signals where $W_x(\theta, t)$ and $W_y(\theta, t)$ are the x- and y-dipole signals, respectively.

$$W^+(\theta, t) = W_x(\theta, t) + W_y(\theta, t) \quad (23)$$

$$W^-(74, t) = W_x(\theta, t) - W_y(\theta, t) \quad (24)$$

In one or more examples, the incoming wave shear direction can be identified using dipole receivers. The sensitivity of a dipole receiver can be high to SH-components and can be low to SV-components. Therefore, the SH-components can be considered for the incident S-waves. For an incident S-wave, the signals observed can be given by equation (25) for x-dipole receivers and by equation (26) for y-dipole receivers.

$$x(t) = SH(t) \cos \theta \quad (25)$$

$$y(t) = SH(t) \sin \theta, \quad (26)$$

SH(t) can be the amplitudes of SH-components and $\theta$ can be the azimuth of incoming wave direction. Using the maximum amplitudes of signals given by equations (27) and (28)

$$A_x = \max_{0<t<T} |x(t_0 + t)| \quad (27)$$

$$A_y = \max_{0<t<T} |y(t_0 + t)| \quad (28)$$

An azimuth containing 90 degree ambiguity can be computed by equation (29) where $\theta'$ is the azimuth containing 90 and 180 degree ambiguities.

$$\theta' = \tan^{-1}\left(\frac{A_y}{A_x}\right) \quad (29)$$

Here $A_x$ and $A_y$ can be replaced by RMS amplitudes defined previously by equations (9) and/or (11). To remove a 90 degree ambiguity, the following two values can be defined by equations (30) and (31).

$$SH^+ = \max_{0<t<T} |x(t)\cos\theta' - y(t)\sin\theta'| \quad (30)$$

$$SH^- = \max_{0<t<T} |x(t)\cos\theta' + y(t)\sin\theta'| \quad (31)$$

Then, $\theta = \theta'$, if $SH^+ > SH^-$, holds and $\theta = -\theta'$, if $SH^+ < SH^-$ holds. $\theta$ can be computed for each level of hydrophone level (e.g., receiver unit 260), and a median or average can be taken to increase the robustness of computation. In the procedure shown above, $SH^+$ and $SH^-$ can be estimated using RMS amplitudes. The azimuthal direction of the incoming wave, which contains a 180 degree ambiguity, can be solved. Once $\theta$ is determined, the waveforms can be projected on the incoming wave direction to obtain the optimum image as shown by equation (32). The migration images for arrays of each dipole receiver can be used instead of waveforms.

$$SH = x(t) \cos \theta - y(t) \sin \theta \quad (32)$$

Figure 13:
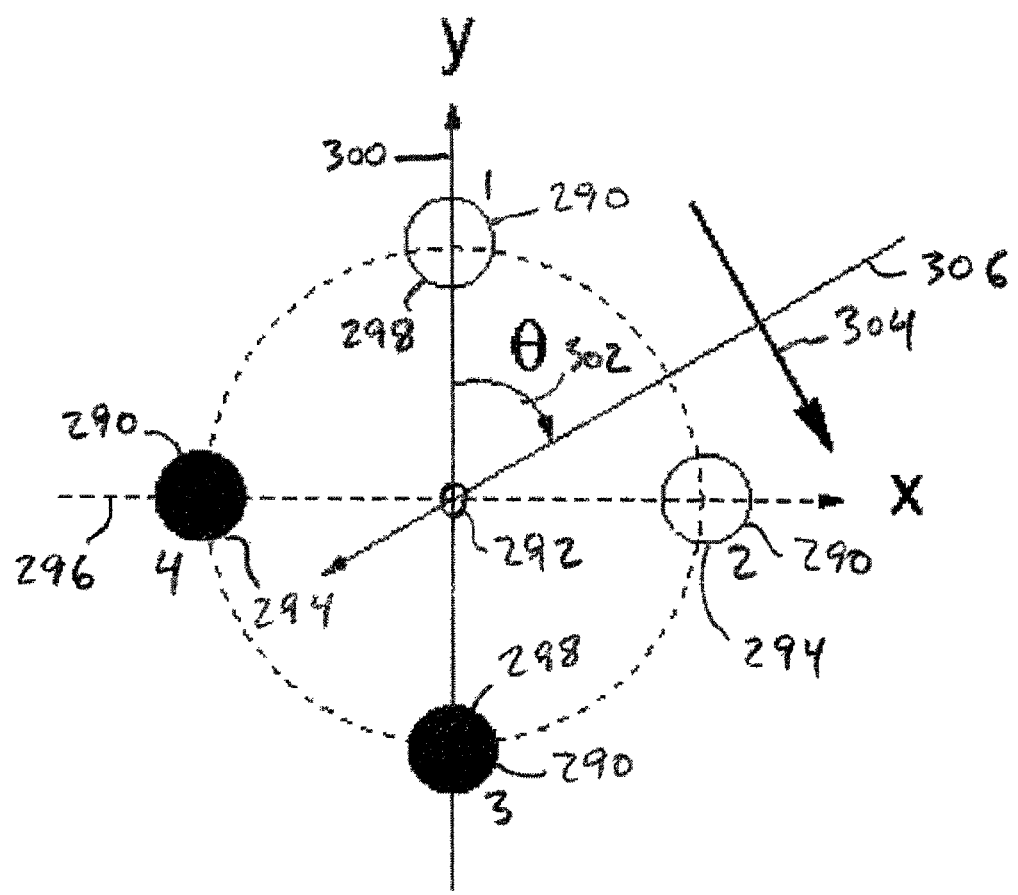
FIG. 13 depicts a sectional schematic view of a portion of an example of a receiver unit shown in FIG. 3, according to one or more embodiments described.

FIG. 13 depicts a sectional schematic view of at least a portion of an example of a receiver unit 190 shown in FIG. 3, according to one or more embodiments. In one or more examples the receiver unit 190 can include four receivers 290 which can be spaced azimuthally around a central axis 292. The receiver unit can include more or less receivers 290, and the receivers 290 can be hydrophones. A dipole receiver 294 can be constructed on an x-axis 296, and another dipole receiver 298 can be constructed on a y-axis 300. An azimuth $\theta$, shown by arrow 302, can be measured clockwise from the y-axis 300. An arrow 304 shows the particle motion of the SH-wave and an arrow 306 shows the particle motion of the incident P-wave.

Receiver unit 190 can be part of one or more sonic logging tools such as the LWD module 130 and/or 131 (FIG. 1) and/or one or more of the acoustic logging modules 164 and/or 165 (FIG. 2), or can be part of another type of sonic logging tool. As shown in FIG. 13, the receivers 290 are denoted with index numbers 1-4 for purposes of explanation. The receivers 290 shown in FIG. 13 are spaced apart from one another at 90 degree intervals. In one or more examples, sonic logging tool 130, 131, 164 and/or 165 having one or more receiver units 190 can be used for identifying directions of incoming SH-waves in a borehole.

An incoming shear wave direction can be identified using multiple sources. Let two sets of dipole components be x1(t) and y1(t), and x2(t) and y2(t). The following composed waveforms can be defined by equations (33)-(36).

$$x^+(t) = x1(t) + x2(t) \quad (33)$$

$$y^+(t) = y1(t) + y2(t) \quad (34)$$

$$x^-(t) = x1(t) - x2(t) \quad (35)$$

$$(t) = y1(t) - y2(t) \quad (36)$$

The maximum or RMS amplitudes can be defined for the composed waveforms and can be denoted by $A_{x+}$, $A_{y+}$, $A_{x-}$ and $A_{y-}$. A ratio of amplitude can be defined by equation (37)

$$R = \frac{A_{x+} + A_{y+}}{A_{x-} + A_{y-}} \tag{37}$$

If R>1, $x^+(t)$ and $y^+(t)$ can be selected, otherwise, $x^-(t)$ and $y^-(t)$ can be selected for x(t) and y(t), respectively, in the process described above. The following procedures can be the same or substantially similar as the procedures discussed and described above. This process can be applicable to 4-C dipole data. If the number of sources is greater than 2, the data can be divided into subsets of two sources and composed. The migration images for arrays of each dipole receiver can be used instead of waveforms.

In one or more examples, an incoming shear wave direction can be identified using 4-C dipole data. In a BARS survey, the radiation of one or more dipole sources and the reception of one or more dipole receivers for the SH-waves can be reciprocal, however, this relation does not hold for the SV-waves. Signal amplitudes of SV-waves can be attenuated by the dipole receiver and they can be omitted in 4-C dipole data. 4-C dipole data can be written using SH-components as shown in equation (38) where SH is the amplitude of the SH-wave and θ is the strike of reflector.

$$\begin{pmatrix} xx & xy \\ yx & yy \end{pmatrix} = \begin{pmatrix} SH\cos^2\theta & -SH\cos\theta\sin\theta \\ -SH\cos\theta\sin\theta & SH\sin^2\theta \end{pmatrix} \tag{38}$$

The matrix shown in equation (38) can be diagonalized using the Alford rotation as shown in equation (39).

$$R(\theta)\begin{pmatrix} xx & xy \\ yx & yy \end{pmatrix}R^T(\theta) = \begin{pmatrix} SH & 0 \\ 0 & 0 \end{pmatrix} \tag{39}$$

where R(θ) is shown in equation (40).

$$R(\theta) = \begin{pmatrix} \cos\theta & \sin\theta \\ -\sin\theta & \cos\theta \end{pmatrix} \tag{40}$$

To find θ, various processes can be used to identify the fast and slow axis of formation using the Alford rotation as discussed and described in, for example, C. Esmersoy et al., "Fracture and Stress Evaluation Using Dipole-Shear Anisotropy Logs," SPWLA 36th Annual Logging Symposium, 26-29 June, Paris, France, 1995. However, (1.1) element can be maximized (or minimizing elements excluding (1.1) element) rather than minimizing the off-diagonal elements from the form of diagonal matrix if the least-squares processes are used. The minimization of off-diagonal elements can cause inaccurate estimation because (2,2) elements should be also small relative to the (1.1) element.

Figure 14:
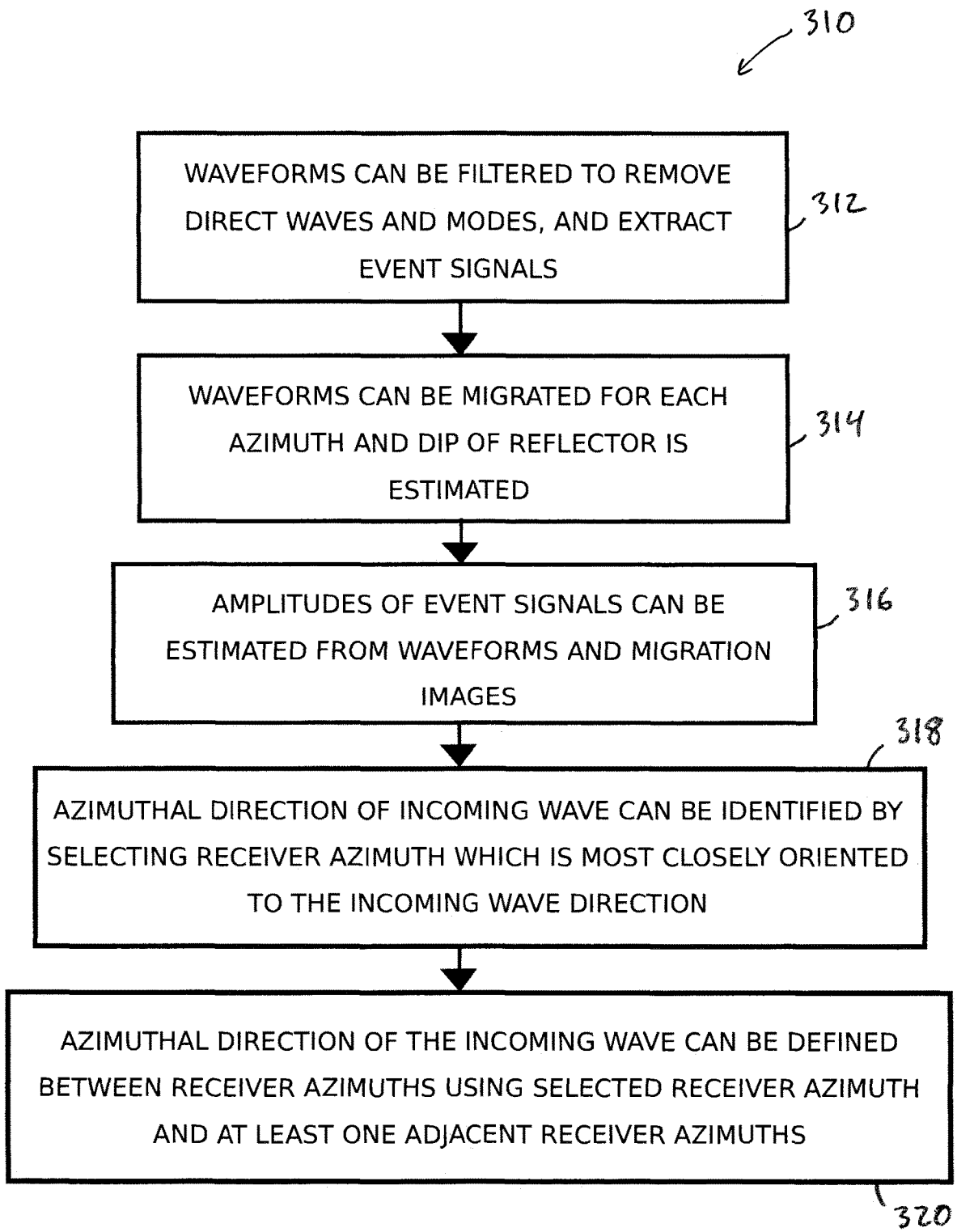
FIG. 14 depicts a flow diagram of a process for determining a direction of an incident wave, according to one or more embodiments described.

FIG. 14 depicts a flow diagram of a process 310 for determining a direction of an incident wave, according to one or more embodiments. Waveforms can be received by a receiver unit and waveform signals generated by the receiver unit can be filtered to remove direct waves and modes, and event signals can be extracted from the waveform signals (process block 312). The waveform signals can be migrated for each azimuth of the receiver unit and the dip of the reflector can be estimated (process block 314). Amplitudes of event signals can be estimated from the waveform signals and the migration images (process block 316). The azimuthal direction of the incoming wave can be identified by selecting the receiver (e.g., hydrophone) azimuth to which the incoming wave direction is most closely oriented (process block 318). The azimuthal direction of the incoming wave between receiver azimuths can be defined using the azimuth of the receiver selected in process block 318 and azimuths of the receivers adjacent to the receiver selected in process block 318 (process block 320).

9. A process comprising: receiving acoustic waveforms with a downhole receiver unit having a plurality of acoustic receivers that are arranged azimuthally around a center axis of the receiver unit, the receiver unit producing waveform signals in response to the received acoustic waveforms; removing direct waves and modes from the waveform signals; extracting event signals from the waveform signals; migrating the waveform signals for each azimuth of the acoustic receivers to produce migration images; estimating a dip of a reflector; estimating amplitudes of the event signals; selecting the acoustic receiver azimuth that is most closely oriented to the incoming wave direction; and identifying an azimuthal direction of acoustic wave forms using the selected acoustic receiver and at least one acoustic receiver adjacent to the selected acoustic receiver.

10. The process according to paragraph 9, wherein the amplitudes of the event signals are estimated as a maximum amplitude of the event signals extracted from the waveform signals.

11. The process according to paragraph 9, wherein the amplitudes of the event signals are estimated as a root-mean-squared amplitude of the event signals from the waveform signals.

12. The process according to paragraph 9, wherein the amplitudes of the event signals are estimated as a maximum amplitude of the event signals from the migration images.

13. The process according to paragraph 9, wherein the amplitudes of the event signals are estimated as a root-mean-squared amplitude of the event signals from the migration images.

14. The process according to any one of paragraphs 9 to 13, wherein the acoustic waveforms are received with pairs of acoustic receivers that are positioned symmetrically across the center axis of the receiver unit from one another.

Synchronization of Seismic Systems in a Multi-Well Environment

Figure 15:
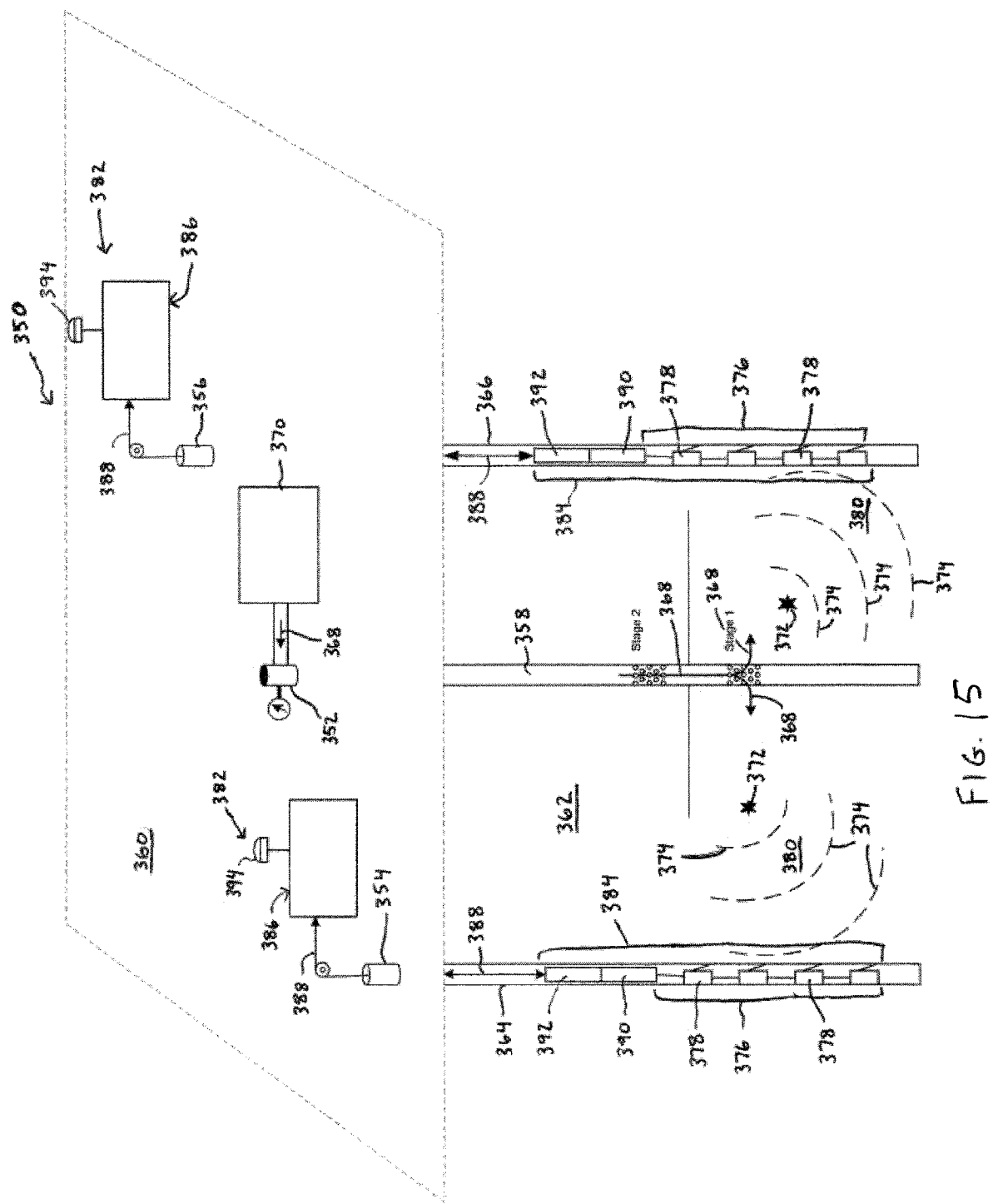
FIG. 15 depicts a schematic perspective view of a hydraulic fracture monitoring (HFM) operation, according to one or more embodiments described.

FIG. 15 depicts a schematic perspective view of a hydraulic fracture monitoring (HFM) operation 350, according to one or more embodiments. In one or more examples, HFM operation 350 can include a treatment well 352, a first monitoring well 354, and a second monitoring well 356. HFM operation 350 can have more than two monitoring wells or can have a single monitoring well. The treatment well 352 includes a treatment wellbore 358 which extends from a wellsite surface area 360 into the earth's lithosphere 362. The first monitoring well 354 includes a first monitoring wellbore 364, and the second monitoring well 356 includes a second monitoring wellbore 366, which extend from different parts of the wellsite surface 360 into the earth's lithosphere 362.

During the HFM operation 350, a fluid 368 under high-pressure can be pumped into the treatment well 352 from a pumping unit 370 at the surface 360. The high-pressure fluid enters formations in the lithosphere and causes the formations to undergo stressing in proportion to the net treatment pressure. Hydraulic fracture operations can be conducted for a single stage, or multiple stages within the treatment well. The applied pressure from the fluid 368 affects the stability of weak planes in the formation which cause shear slippage resulting in micro-earthquakes or microseisms events 372. These microseisms events 372 emit elastic microseismic waves 374 which can be detected by receiver unit arrays 376 deployed in the monitoring wellbores 364 and 366.

Microseismic events 372 can be located by tracing the path made by the acoustic microseismic wave 374 from the source of the wave 374 (e.g., the microseismic event 372) to the receivers 376, and retracing it back to the source. The time difference between P-wave and S-wave arrivals can be combined with the velocities (Vp and Vs respectively) to extrapolate the distance from the listening location at the receiver unit arrays 376 to the origin of the event. An illustrative process that can be used to extrapolate the distance from the listening location to the origin of the event can include the process discussed and described in SPE paper 30507, 1995. '*Microseismic Mapping of Hydraulic Fractures Using Multi-Level Wireline Receivers*'.

The accuracy of the HFM measurement can depend on several factors, such as, for example: the uncertainties in velocity models and how well they represent the actual velocities in a formation 380 of the lithosphere through which the elastic waves 374 travel; the uncertainties in the event time chosen; the signal to noise ratio of the recorded microseismic events; and/or the distance and position of the monitoring well or monitoring wells 354/356 with respect to the treatment well and/or the microseismic event location.

Due to attenuation of the microseismic waves 374 as they travel through the formation 380, there can be a limit to the distance at which microseismic events from the treatment well can be usefully recorded in a monitoring well. When other wells are available, deploying seismic receivers, such as receiver unit arrays 376 in dual, triple or larger numbers of monitoring wells, provides a more complete areal coverage around the vicinity of the treatment well 352.

Timing errors caused by uncertainties in the time determined as the time of the event can induce errors in the estimated position of the microseismic event 372. For example, depending on the actual formation velocity, a 1-millisecond timing error can induce a 3-meter error in the estimated position of the microseismic event 372 and a 10-millisecond timing error can induce a 30-meter error in the estimated position.

Figure 16:
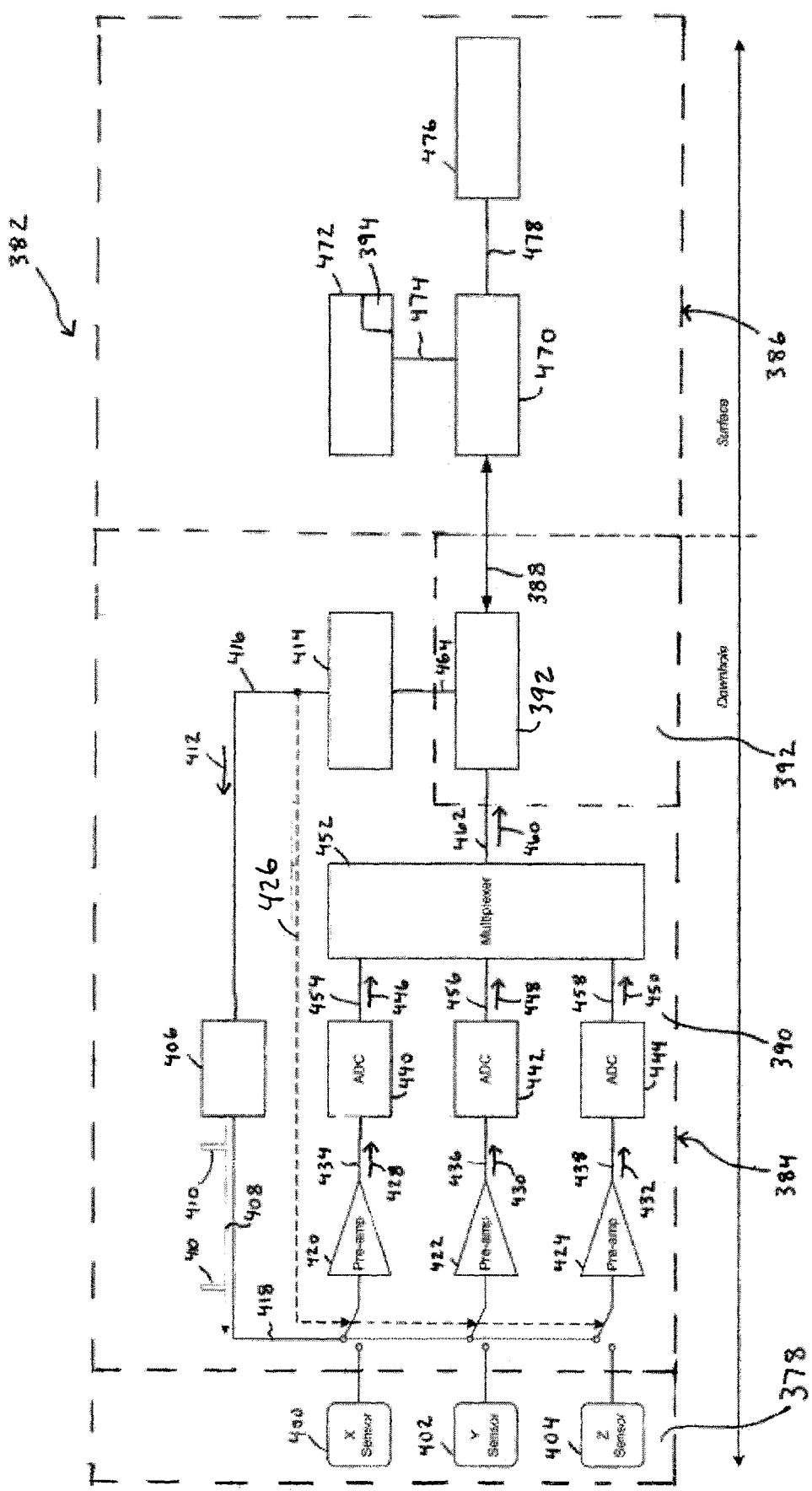
FIG. 16 depicts an electrical block diagram of a seismic recording unit shown in FIG. 15, according to one or more embodiments described.

In one or more examples, the seismic receiver array 376 can be part of a seismic recording unit 382 of a downhole tool 384. FIG. 16 depicts an electrical block diagram of a seismic recording unit 382 shown in FIG. 15, according to one or more embodiments. Seismic recording unit 382 can generate a precise test signal in a downhole environment by generating the test signal in the downhole tool 384. The seismic recording unit 382 can include a surface equipment portion 386 at the wellsite surface 360, and a downhole tool portion 384 which can be supported in the monitoring wellbore 364/366 by a cable 388 (FIG. 15). In one or more example, the downhole tool 384 can include a seismic controller 390 and a telemetry unit 392; and the surface equipment 386 can include a Global Positioning System (GPS) receiver 394.

The cable 388 can be a logging cable which can include a communications channel for carrying communications between the downhole tool 384 and the surface equipment 386. In other examples, the cable 388 is free from a communications channel, for example the cable can be a slickline, and communications between the downhole tool 384 and the surface equipment 386 can be through a wireless communications channel, or through another type of cable. In one or more examples, the seismic recording unit 382 uses time synchronization between the surface equipment 386 and the downhole tool 384 and the time synchronization can be accomplished through the cable 388 or other communication channel.

Verifying accurate time synchronization amongst the seismic recording units 382 can reduce uncertainties in the determination of the event time. In an HFM operation having multiple monitoring wells 354/356, the surface equipment 386 at different monitoring wells 354/356 can be physically separated from one another. Obstructions, terrain, and the distances between the monitoring wells 354/356 can make it difficult or impossible to connect between the seismic recording units 382 at each monitoring well 354/356 for accurate time synchronization between the seismic recording units.

A synchronization timing check can be performed in a lab environment with special test equipment, however the techniques used in the lab environment can be unsuitable for HFM operations in field conditions. In the lab environment, multiple downhole tools 384 can be co-located with one another and internal circuitry of the downhole tool 384 can be readily accessible. In HFM field operations, the downhole tools 384 can be located in the monitoring wellbores 364/366 of separate monitoring wells 354/356. Furthermore, sending a test pulse simultaneously to the downhole tool 384 of each of the seismic recording units 382 from a surface test signal generator presents difficulties not found in a lab environment, such as, for example, degradation of the test pulse's shape and amplitude. This signal degradation can lead to variable time delays, especially when the length of the cable 388 (e.g., logging cable) is long, and when cables 388 in different seismic recording units have different lengths.

The downhole tool 384 can include one receiver unit 378, or an array of receiver units 376 (FIG. 15), and the receiver unit(s) can each include one or more receivers 400, 402 and 404, which can be x-axis oriented, y-axis oriented, and z-axis oriented, respectively. In one or more examples, a test pulse generator 406 can generate a test pulse signal 408 having one or more test pulses 410 in response to receiving a pulse start command signal 412 from a pulse time decoder 414. The pulse start command signal 412 can be communicated to the test pulse generator 406 over a pulse start command channel 416. The test pulse signal 408 can be communicated over a test pulse channel 418 to an x-axis preamp 420, a y-axis preamp 422, and a z-axis preamp 424.

During test pulse operations, a switch line 426 can be activated to disconnect the receivers 400, 402, and 404 from the preamps 420, 422, and 424, respectively, and to connect the test pulse channel 418 to the preamps. Switch line 426 can be connected to the pulse time decoder 414 or to the pulse start command channel 416, or other control to connect the preamps to receive the test pulse signal 408. After receiving the test pulse signal 408, the preamps 420, 422, and 424 each amplify the signal and sent amplified pulse signals 428, 430, and 432 over amplifier channels 434, 436 and 438, respectively, to analog-to-digital converters (ADC) 440, 442, and 444, respectively. ADCs 440, 442, and 444 convert the amplified pulse signals 428, 430 and 432, respectively, from analog to digital pulse signals 446, 448, and 450, respectively, which can then be communicated to a multiplexer 452 over ADC channels 454, 456, and 458, respectively.

Multiplexer 452 receives the digital pulse signals 446, 448, and 450 and multiplexes the signals into a digital pulse signal 460 which contains the digital pulse signals 446, 448 and 450 and which can be sent to the telemetry unit 392 (FIGS. 15 and 16) over a signal channel 462. The telemetry unit 392 can be connected to the surface equipment 386 through the cable 388 (e.g., logging cable) and to the pulse time decoder 414 through a decoder channel 464.

In one or more examples, the surface equipment 386 can include a recording system 470 connected to the cable 388; a pulse time generator 472 which can include GPS receiver 394 and which can be connected to the recording system 470 through a pulse time generator channel 474; and a transceiver 476 which can be connected to the recording system 470 through a transceiver channel 478. In one or more examples, the transceivers 476 can provide communications between recording systems 470 of the surface equipment 386 at the separate monitoring wells 354/356. In one or more examples, the transceivers 476 can be communicatively connected with the surface equipment 386 of the monitoring wells 354/356 through wired cable, fiber optic cable, radio link, and/or other communication carriers. Recording system 470 can include a data processing system which can include one or more processors and data memory. Signal and data channels in the surface equipment 386 and the downhole tool 384 can include circuit board traces, wires, cables, busses, and/or other signal conductors. Other control signals and channels can be included but are not shown for purposes of simplifying the diagram.

Figure 17:
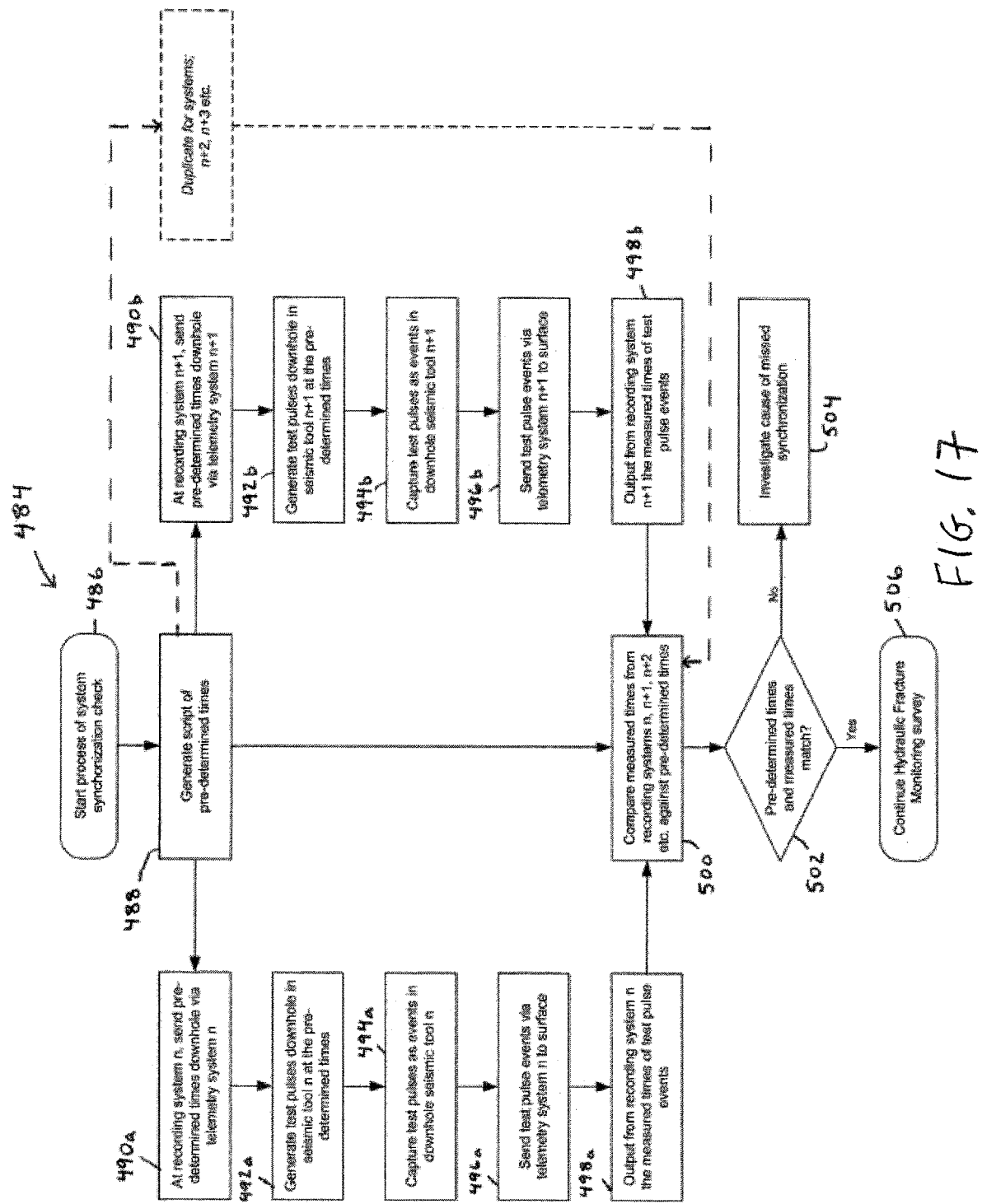
FIG. 17 depicts a flow diagram of a process for time synchronization among two or more seismic recording units shown in FIG. 15.

FIG. 17 depicts a flow diagram of a process 484 for time synchronization among two or more seismic recording units 382 shown in FIG. 15. Accurate time synchronization among seismic recording units 382 in a HFM operation 350 can reduce inaccuracies in event location caused by event time uncertainties. Process 484 is shown for two seismic recording units 382a and 382b and the process blocks of the processes which can be performed by the different seismic recording units are denoted with corresponding subscripts.

Process 484 begins at a control to begin the synchronization check (process block 486). The control to begin the check can be automatic or manual following the placement of the seismic recording units 382. Process 484 then generates a script of pre-determined times and the pulse time generator 472a/472b generate the predetermined times (process block 488). The recording systems 470a/470b, receive the predetermined times from the pulse time generators 472a/472b and send the predetermined times downhole via the cable 388a/388b to the telemetry unit 392a/392b of the downhole tools 384a/384b (process block 490a/490b).

The predetermined times can then be sent to the pulse time decoder 414a/414b which decodes the predetermined time data from the telemetry unit and the pulse time decoder sends the pulse start command signal 412 to the test pulse generator 406a/406b which then produces the test pulse signal 408a/408b (process block 492a/492b). The test pulses can be sent through the preamps 420a/420b, 422a/422b, and 424a/424b; the ADCs 440a/440b, 442a/442b, and 444a/444b; and the multiplexer 452a/452b and the test pulses can be captured as test pulse events signals in the multiplexed digital pulse signal 460a/460b (process block 494a/494b). The test pulse events signal can be sent to the recording system 470a/470b of the surface equipment 386a/386b via the telemetry unit 392a/392b (process block 496a/496b). The times of the test pulse events signal can be measured by the recording system 470a/470b and the measured times can be output from the seismic recording unit 382a/382b via the transceiver 476a/476b (process block 498a/498b).

The measured times from the different recording systems 470a and 470b can be compared against the pre-determined times produced in process block 488 (process block 500). A decision can be made as to whether the pre-determined times and the measured times match (decision block 502). If the decision at decision block 502 is that the pre-determined times do not match the measure times then the process 484 proceeds to process block 504 where the cause of the missed synchronization can be investigated. If the decision at decision block 502 is that the pre-determined times do match the measure times then the process 484 proceeds to process block 506 where the HFM survey continues. It should be noted that process 484 can be used for more than two seismic recording units and process blocks 490n, 492n, 494n, 496n, and 498n performed by seismic recording units 382n are not specifically shown.

The process 484 can generate a set of pre-determined times; generate the test pulses downhole at the pre-determined times; and can compare the measured times against the pre-determined times. The process 484 can be used to compare the event times generated in a borehole environment against a set of pre-determined times independent of: the formation velocities; uncertainties in the velocity (Vp and Vs) models; the signal to noise ratio of the recorded microseismic events; and/or the distance and position of the monitoring well 354/356 or wells with respect to the treatment well 352. This verification of timing test can be conducted at different points throughout the HFM operation, for example, before start of fluid injection at the $1^{st}$ stage, between subsequent stages of fluid injection; and/or after the final stage of fluid injection before pulling the seismic tools out from the monitoring wells 354/356.

Figure 18:
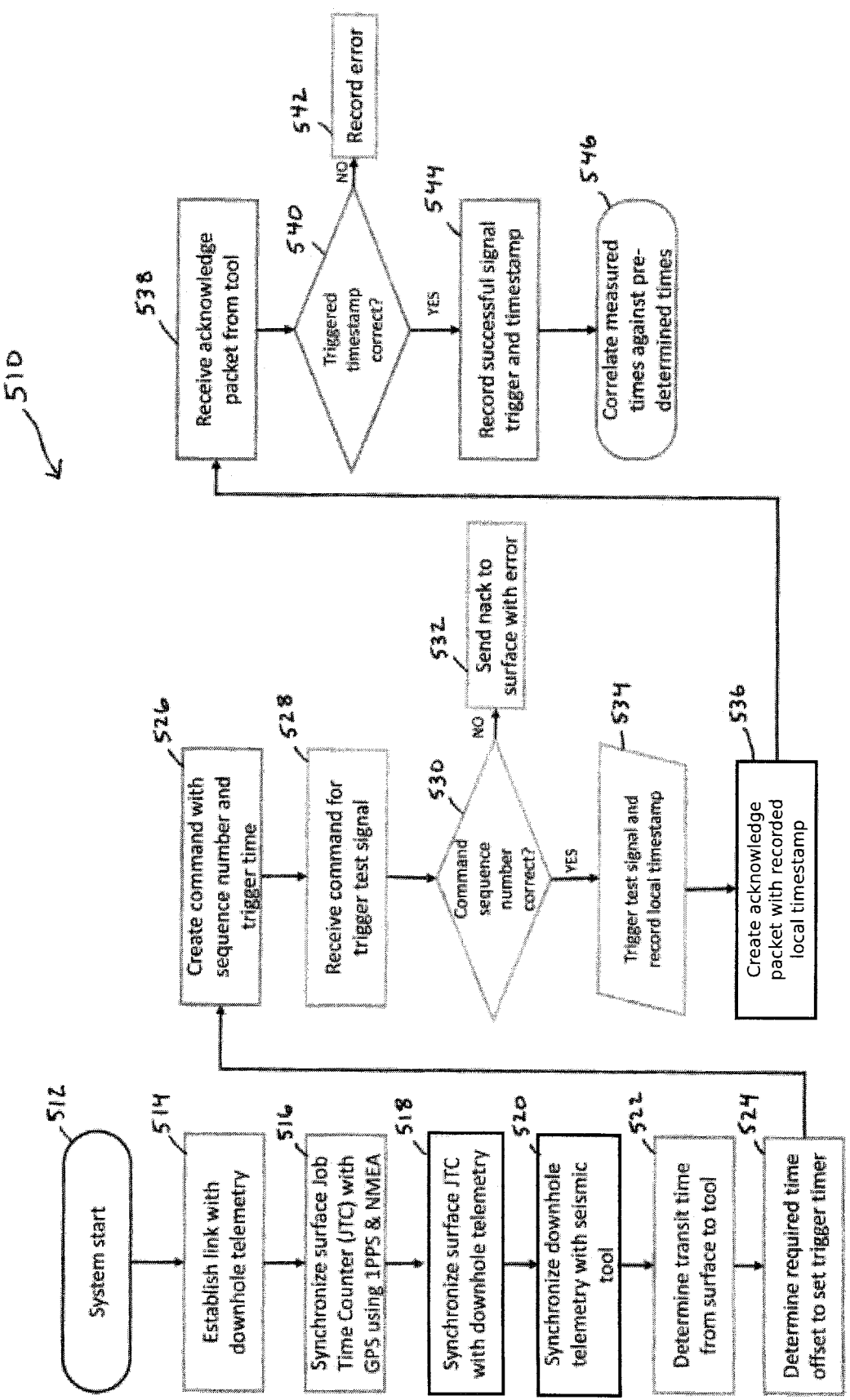
FIG. 18 depicts a flow diagram of a process for telemetry commands between surface equipment and a downhole tool in the process shown in FIG. 17.

FIG. 18 depicts a flow diagram of a process 510 for telemetry commands between surface equipment and a downhole tool in the process shown in FIG. 17. Process 510 begins at process block 512 and can proceed to establish a link with the downhole telemetry unit 392 (process block 514). The process can synchronize a surface job time counter (JTC) with GPS using 1PPS and NMEA (process block 516). The surface JTC can be synchronized with the downhole telemetry unit 392 (process block 518). The downhole telemetry unit 392 can be synchronized with the seismic tool (process block 520). The JTC can be loaded from the surface equipment 386 into the downhole telemetry unit 392 so that the downhole tool 384 can be synchronized with an absolute timing (e.g., GPS). A transit time from the surface equipment 386 to the downhole tool 384 can be determined (process block 522). The time offset for setting a trigger time can be determined (process block 524). A command can be created with the sequence number and trigger time (process block 526). In one or more examples, the command can be created with the sequence number and trigger time in the surface equipment 386. A command for a trigger test signal can be received (process block 528). In one or more examples, the trigger test signal command can be received by the downhole tool 384.

The accuracy of the command sequence number is verified at decision block 530. If the determination is that the command sequence number is inaccurate then a negative acknowledgement (nack) can be sent to the surface equipment with an error (process block 532). If the determination at decision block 530 is an accurate command sequence number then a trigger test signal can be generated and a local timestamp can be recorded (process block 534). An acknowledge packet can be created with the recorded local timestamp (process block 536). The acknowledge packet can be received from the downhole tool 384 by the surface equipment 386 (process block 538). A determination can be made as to whether the triggered timestamp is correct or not correct at determination block 540. If the determination is that the triggered timestamp is not correct then a record error can be generated at process block 542. If the determination is that the triggered timestamp is correct then the successful signal trigger and timestamp can be recorded (process block 544). The measured times can be correlated against predetermined times (process block 546) where the process 510 ends.

Surface equipment 386 at different monitoring wells can trigger the test signals and record the timestamped test signals independently from one another. The relative time offsets between the different monitoring wells can be measured against predetermined times and can be used to align waveforms between multiple monitoring wells.

15. A process for monitoring a hydraulic fracture, comprising: generating test pulses at predetermined times in at least one monitoring well; capturing the test pulses as test pulse event signals in the monitoring well; sending the test pulse event signals to surface equipment; and comparing the test pulse event signals to the predetermined times to verify at least one formation velocity.

16. The process according to paragraph 15, further comprising injecting fluid into a treatment well after generating the test pulses.

17. The process according to paragraph 15 or 16, wherein the test pulses are generated between stages of fluid injection into a treatment well.

18. The process according to any one of paragraphs 15 to 17, wherein the test pulses are generated in the monitoring well by a seismic tool and the test pulses are generated after a final stage of fluid injection into a treatment well and before removing the seismic tool from the monitoring well.

19. The process according to any one of paragraphs 15 to 18, wherein the test pulse event signals are compared to the predetermined times to verify the formation velocity of P-waves.

20. The process of according to any one of paragraphs 15 to 19, wherein generating test pulses includes generating a first test pulse at a first predetermined time in a first monitoring well, and generating a second test pulse at a second predetermined time in a second monitoring well, and wherein capturing the test pulses includes capturing the first test pulse as a first test pulse event signal in the first monitoring well and capturing the second test pulse as a second test pulse event signal in the second monitoring well, and wherein sending the test pulse event signals includes sending the first test pulse event signal to first surface equipment of the first monitoring well and sending the second test pulse event signal to second surface equipment of the second monitoring well, and the process further comprising: time synchronizing the first surface equipment and the second surface equipment to one another using the first test pulse event signal and the second test pulse event signal.

21. The process according to any one of paragraphs 15 to 20, wherein the test pulse event signals are compared to the predetermined times to verify the formation velocity of S-waves.

Although the preceding description has been described herein with reference to particular means, materials, and embodiments, it is not intended to be limited to the particulars disclosed herein; rather, it extends to all functionally equivalent structures, processes, and uses, such as are within the scope of the appended claims.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A seismic system, comprising:
   an acoustic tool configured for placement in a wellbore penetrating a subterranean formation, the acoustic tool comprising:
   an acoustic transmitter unit for producing acoustic energy waveforms in the subterranean formation such that interaction of the acoustic energy waveforms with structures in the formation is an event that generates event signals; and
   a receiver unit comprising acoustic receivers distributed azimuthally around a central axis of the acoustic tool for sensing the event signals; and wherein the acoustic tool is configured to:
   determine event signal amplitudes of the event signals at each of the acoustic receivers; and
   determine which of the acoustic receivers has a maximum amplitude of the event signal amplitudes; and
   interpolate between the maximum amplitude acoustic receiver and one or more adjacent acoustic receivers to find an azimuthal direction of the event.

2. The seismic system of claim 1, wherein the receiver unit comprises an even number of the acoustic receivers.

3. The seismic system of claim 2, wherein the receiver unit comprises at least eight of the acoustic receivers.

4. The seismic system of claim 1, wherein the acoustic transmitter unit is a dipole acoustic transmitter unit.

5. The seismic system of claim 1, wherein the acoustic tool is configured to determine which acoustic receiver has a root-mean-squared maximum amplitude value of the event signal.

6. The seismic system of claim 1, wherein the acoustic transmitter unit is configured to produce the acoustic energy waveforms in the subterranean formation when the acoustic tool is surrounded by a fluid in the wellbore.

7. The seismic system of claim 1, wherein the acoustic transmitter unit is configured to produce monopole and dipole azimuthal acoustic energy waveform modes.

8. The seismic system of claim 1, the acoustic tool further configured to remove direct wave and modes from the acoustic energy waveform before determining the event signal amplitudes.

* * * * *